US012720056B2

(12) United States Patent
Ahn et al.

(10) Patent No.: US 12,720,056 B2
(45) Date of Patent: Aug. 25, 2026

(54) DEEP LEARNING-BASED IMAGE CODING METHOD AND DEVICE

(71) Applicant: INTELLECTUAL DISCOVERY CO., LTD., Seoul (KR)

(72) Inventors: Yongjo Ahn, Seoul (KR); Jongseok Lee, Seoul (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 447 days.

(21) Appl. No.: 18/259,055

(22) PCT Filed: Dec. 22, 2021

(86) PCT No.: PCT/KR2021/019571

§ 371 (c)(1),
(2) Date: Jun. 22, 2023

(87) PCT Pub. No.: WO2022/139438

PCT Pub. Date: Jun. 30, 2022

(65) Prior Publication Data

US 2024/0056575 A1 Feb. 15, 2024

(30) Foreign Application Priority Data

Dec. 22, 2020 (KR) ........................ 10-2020-0180799
Dec. 22, 2020 (KR) ........................ 10-2020-0180800

(51) Int. Cl.
*H04N 19/124* (2014.01)
*G06V 10/771* (2022.01)
*G06V 10/82* (2022.01)

(52) U.S. Cl.
CPC ......... *H04N 19/124* (2014.11); *G06V 10/771* (2022.01); *G06V 10/82* (2022.01)

(58) Field of Classification Search
CPC .... H04N 19/124; H04N 19/13; H04N 19/136; H04N 19/184; G06V 10/771; G06V 10/82; G06N 3/04; G06N 3/08; G06T 9/00
See application file for complete search history.

(56) References Cited

U.S. PATENT DOCUMENTS 9,940,729 B1 * 4/2018 Kwant .................. G06V 20/56
10,318,842 B1 * 6/2019 Kim ...................... G06N 3/084
10,785,681 B1 * 9/2020 Ge ....................... G06F 18/253
(Continued)

FOREIGN PATENT DOCUMENTS

KR 10-2020-0016879 A 2/2020
KR 10-2083166 B1 3/2020
KR 10-2020-0071404 A 6/2020

OTHER PUBLICATIONS

International Search Report for PCT/KR2021/019571 by Korean Intellectual Property Office dated Apr. 4, 2022.
(Continued)

*Primary Examiner* — Xuemei G Chen
(74) *Attorney, Agent, or Firm* — BROADVIEW IP LAW, PC

(57) ABSTRACT

A deep learning-based signal processing method according to the present invention may: obtain a quantized feature map from a bitstream; reconstruct the feature map by performing inverse quantization on the quantized feature map; and synthesize the reconstructed feature map on the basis of a neural network.

9 Claims, 36 Drawing Sheets

(56) References Cited

U.S. PATENT DOCUMENTS 10,909,728 B1 * 2/2021 Appalaraju ........... G06T 3/4046
11,445,222 B1 * 9/2022 Andreopoulos ..... G06N 3/0464
11,948,090 B2 * 4/2024 Jiang ....................... G06F 17/18
11,961,000 B2 * 4/2024 Holland ............... G06N 3/0495
2006/0188012 A1 * 8/2006 Kondo .................. H04N 19/61
2014/0321528 A1 * 10/2014 Jung .................... H04N 19/436
375/240.02
2018/0150740 A1 5/2018 Wang et al.
2019/0050682 A1 * 2/2019 Sutic ..................... G06T 1/0014
2019/0082177 A1 * 3/2019 Cho ....................... H04N 19/86
2019/0370667 A1 * 12/2019 Georgiadis ............... G06N 3/10
2020/0143226 A1 * 5/2020 Georgiadis ............... G06N 3/08
2020/0145661 A1 * 5/2020 Jeon ..................... G06N 3/0464
2020/0280717 A1 * 9/2020 Li .......................... H04N 19/19
2020/0320392 A1 * 10/2020 Lin ...................... G06N 3/0499
2020/0382929 A1 * 12/2020 Shi ........................... G06N 3/08
2021/0224668 A1 * 7/2021 Kim ......................... G06N 3/04
2021/0232851 A1 * 7/2021 Redford ............... G06V 10/751
2021/0357651 A1 * 11/2021 Fan ...................... G06N 3/0464
2021/0392355 A1 * 12/2021 Zhao ...................... H04N 19/44
2022/0005233 A1 * 1/2022 Kudo ................... H04N 19/184
2022/0101564 A1 * 3/2022 Patel .................... H04N 19/196
2022/0164995 A1 * 5/2022 Aytekin .................. G06T 9/002
2022/0375133 A1 * 11/2022 Wang ........................ G06T 9/00
2022/0393986 A1 * 12/2022 Haase ...................... G06N 3/04
2023/0082561 A1 * 3/2023 Kim ..................... H04N 19/124
375/240.03
2023/0100930 A1 * 3/2023 Tan ........................ G06N 3/063
706/25
2023/0106778 A1 * 4/2023 Karabutov ............... G06N 3/08
706/15
2023/0133895 A1 * 5/2023 Murata .................. H04N 19/18
375/240.19
2023/0164336 A1 * 5/2023 Cricri ..................... H04N 19/46
375/240.08
2023/0239516 A1 * 7/2023 Mao ....................... H04N 19/30
375/240.12
2023/0267313 A1 * 8/2023 Kim ..................... G06N 3/0464
706/27
2024/0013046 A1 * 1/2024 Le ............................ G06N 3/08

OTHER PUBLICATIONS

Zhou, Yiren et al. "Adaptive Quantization for Deep Neural Network." Singapore University of Technology and Design (SUTD). Ecole Polytechnique Federale de Lausanne (EPFL). arXiv:1712.01048v1 [cs.LG] Dec. 4, 2017.

* cited by examiner (b) Example on form of input/output feature map (a) Example on form of input/output image (a) Channel packing (b) Space packing (a) Channel packing First sub-picture Second sub-picture

2C

W

H (b) Space packing

Packed sub-picture

First sub-picture

Second sub-picture

Padding region

C

W

2H

2530

Second feature prediction neural network

Prediction feature map c w h (a) Channel packing

First sub-picture

Second sub-picture

2C

W

H (b) Space packing

Packed sub-picture

First sub-picture

Second sub-picture

Padding region

C

W

2H

Second feature prediction neural network

2520

Prediction feature map c w h

First sub-picture
Second sub-picture
Third sub-picture
C
W
H
(a) Channel packing Packed sub-picture
First sub-picture
Second sub-picture
Third sub-picture
Padding region
C
2W
2H
(b) Space packing Third feature prediction neural network
2530

Prediction feature map
c
w
h

DEEP LEARNING-BASED IMAGE CODING METHOD AND DEVICE

CROSS-REFERENCE TO RELATED APPLICATIONS

This application is a National Phase Entry Application of PCT Application No. PCT/KR2021/019571 filed on Dec. 22, 2021, which claims priority to Korean Patent Application No. 10-2020-0180799 filed on Dec. 22, 2020, and Korean Patent Application No. 10-2020-0180800 filed on Dec. 22, 2020, in Korean Intellectual Property Office, the entire contents of which are hereby incorporated by reference in its entirety.

BACKGROUND ART

A video image is compressed and encoded by removing temporal and spatial redundancy and inter-view redundancy, which may be transmitted through a communication line or may be stored in a form suitable for a storage medium.

DISCLOSURE

Technical Problem

The present disclosure is to improve coding efficiency of a video signal.

Technical Solution

In order to solve the above-described problem, the present disclosure provides a deep learning-based image coding method and device for rate control. In addition, in order to solve the above-described problem, the present disclosure provides a deep learning-based image coding method and device using a feature map prediction neural network.

A deep learning-based signal processing method and device according to an embodiment of the present disclosure may acquire a quantized feature map from a bitstream, reconstruct a feature map by performing dequantization for the quantized feature map and synthesize the reconstructed feature map based on a neural network.

In a deep learning-based signal processing method and device according to an embodiment of the present disclosure, the neural network may include a plurality of synthetic neural networks respectively corresponding to a plurality of predefined compression rates.

In a deep learning-based signal processing method and device according to an embodiment of the present disclosure, the plurality of synthetic neural networks may be learned based on a loss algorithm which minimizes at least one of a bits per pixel (BPP), a peak signal-to-noise ratio (PSNR), or structural similarity index measure (SSIM) at a compression rate corresponding respectively.

In a deep learning-based signal processing method and device according to an embodiment of the present disclosure, it may further include acquiring compression rate information from the bitstream and the compression rate information may include an index which indicates a specific quantization step size within a predefined quantization step size table.

In a deep learning-based signal processing method and device according to an embodiment of the present disclosure, the neural network may include at least one neural network layer of a convolution layer, a correlation layer, a sampling layer, a pooling layer, a transform layer, a shuffle layer, a summation layer, a difference layer, or a stack layer.

In a deep learning-based signal processing method and device according to an embodiment of the present disclosure, synthesizing the feature map may include generating a prediction feature map of the current sub-picture by performing prediction for a feature map of a current sub-picture in a current picture and synthesizing a feature map of the current sub-picture by adding the prediction feature map to the reconstructed feature map.

In a deep learning-based signal processing method and device according to an embodiment of the present disclosure, the reconstructed feature map may include a residual feature map of the current sub-picture.

In a deep learning-based signal processing method and device according to an embodiment of the present disclosure, the neural network may be learned to minimize a sum of a difference value between the prediction feature map and an original feature map.

In a deep learning-based signal processing method and device according to an embodiment of the present disclosure, the current sub-picture may be generated by adding pixels at a specific position in pixel blocks partitioned from the current picture.

Technical Effects

According to an embodiment of the present disclosure, a video signal coding efficiency may be improved through deep learning-based image coding for rate control.

In addition, according to an embodiment of the present disclosure, a video signal coding efficiency may be improved through deep learning-based image coding using a feature map prediction neural network.

DESCRIPTION OF DIAGRAMS

BEST MODE

Figure 1:
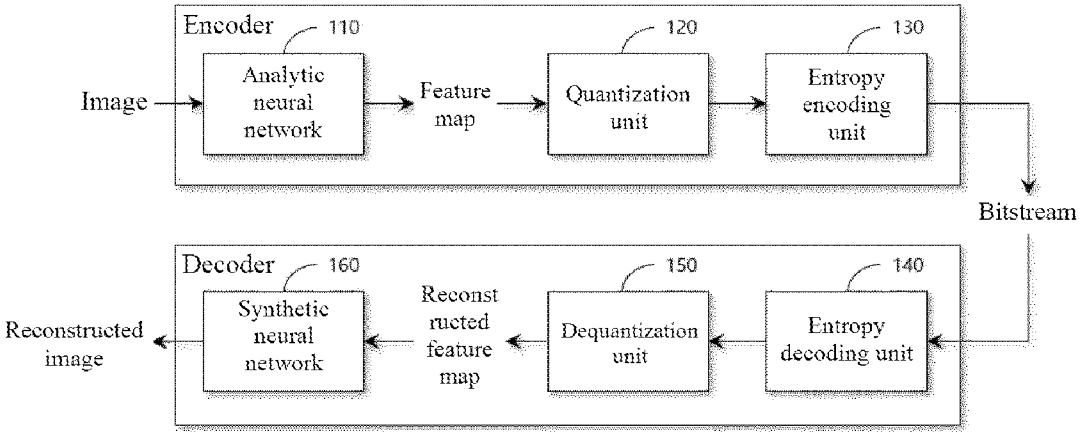
FIG. 1 is a block diagram of a deep learning-based image processing device according to an embodiment.

A deep learning-based signal processing method and device according to an embodiment of the present disclosure may acquire a quantized feature map from a bitstream, reconstruct a feature map by performing dequantization for the quantized feature map and synthesize the reconstructed feature map based on a neural network.

In a deep learning-based signal processing method and device according to an embodiment of the present disclosure, the neural network may include a plurality of synthetic neural networks respectively corresponding to a plurality of predefined compression rates.

In a deep learning-based signal processing method and device according to an embodiment of the present disclosure, the plurality of synthetic neural networks may be learned based on a loss algorithm which minimizes at least one of a bits per pixel (BPP), a peak signal-to-noise ratio (PSNR), or structural similarity index measure (SSIM) at a compression rate corresponding respectively.

In a deep learning-based signal processing method and device according to an embodiment of the present disclosure, it may further include acquiring compression rate information from the bitstream and the compression rate information may include an index which indicates a specific quantization step size within a predefined quantization step size table.

In a deep learning-based signal processing method and device according to an embodiment of the present disclosure, the neural network may include at least one neural network layer of a convolution layer, a correlation layer, a sampling layer, a pooling layer, a transform layer, a shuffle layer, a summation layer, a difference layer, or a stack layer.

In a deep learning-based signal processing method and device according to an embodiment of the present disclosure, synthesizing the feature map may include generating a prediction feature map of the current sub-picture by performing prediction for a feature map of a current sub-picture in a current picture and synthesizing a feature map of the current sub-picture by adding the prediction feature map to the reconstructed feature map.

In a deep learning-based signal processing method and device according to an embodiment of the present disclosure, the reconstructed feature map may include a residual feature map of the current sub-picture.

In a deep learning-based signal processing method and device according to an embodiment of the present disclosure, the neural network may be learned to minimize a sum of a difference value between the prediction feature map and an original feature map.

In a deep learning-based signal processing method and device according to an embodiment of the present disclosure, the current sub-picture may be generated by adding pixels at a specific position in pixel blocks partitioned from the current picture.

Mode

An embodiment of the present disclosure will be described in detail so that those skilled in the art can easily implement it by referring to a drawing attached to this specification. But, the present disclosure may be implemented in different forms and it is not limited to an embodiment described herein. And, a part irrelevant to a description is omitted to clearly describe the present disclosure in a drawing and a similar reference numeral is attached to a similar part throughout this specification.

Throughout this specification, when a part is referred to as being 'connected' to other part, it may include an electrical connection that other element presents therebetween as well as a direct connection.

In addition, when a part is referred to as 'including' a component throughout this specification, it means other component may be further included without excluding other component unless otherwise opposed.

In addition, a term such as first, second, etc. may be used to describe a variety of components, but the components should not be limited by the terms. The terms are used only to distinguish one component from other component.

In addition, for an embodiment about a device and a method described in this specification, some configurations of a device or some steps of a method may be omitted. In addition, order of some configurations of a device or some steps of a method may be changed. In addition, other configuration or other step may be inserted into some configurations of a device or some steps of a method.

In addition, some configurations or some steps of a first embodiment of the present disclosure may be added to a second embodiment of the present disclosure or may substitute some configurations or some steps of a second embodiment.

In addition, construction units shown in an embodiment of the present disclosure are independently shown to represent different characteristic functions, and they do not mean that each construction unit is configured with separated hardware or one software construction unit. In other words, each construction unit is described by being enumerated as each construction unit for convenience of a description and at least two construction units of each construction unit may be combined to form one construction unit or one construction unit may be partitioned into a plurality of construction units to perform a function. An integrated embodiment and separated embodiment of each construction unit are also included in a scope of a right of the present disclosure unless they are departing from the spirit of the present disclosure.

First, terms used in this application may be briefly described as follows.

A decoding device (Video Decoding Apparatus) to be described later may be a device included in a server terminal such as a civil security camera, a civil security system, a military security camera, a military security system, a personal computer (PC), a notebook computer, a portable multimedia player (PMP), a wireless communication terminal, a smart phone, a TV application server and a service server, etc. and it may mean a variety of devices equipped with a user terminal including equipment of every kind, a communication device including a communication modem, etc. for communication with a wired/wireless communication network, a memory for storing various kinds of programs and data for decoding an image or performing intra or inter prediction for decoding, a microprocessor for executing a program and performing operation and control and others.

In addition, an image encoded as a bitstream by an encoder may be transmitted to an image decoding device, decoded and reconstructed and reproduced as an image through a variety of communication interface such as a cable, an universal serial bus (USB), etc. or through a wired or wireless communication network, etc. such as the Internet, a wireless local area network, a wireless LAN network, a Wi-Bro network, a mobile communication network, etc. in real time or in non-real time. Alternatively, a bitstream generated by an encoder may be stored in a memory. The memory may include both a volatile memory and a non-volatile memory. In this specification, a memory may be expressed as a recoding medium storing a bitstream.

Commonly, a video may be configured with a series of pictures and each picture may be partitioned into coding units like a block. In addition, a person with ordinary skill in the art to which this embodiment pertains may understand that a term of picture entered below may be used by being substituted with other term having the same meaning as an image, a frame, etc. And, a person with ordinary skill in the art to which this embodiment pertains may understand that a term of coding unit may be used by being substituted with other term having the same meaning as a unit block, a block, etc.

Hereinafter, in reference to attached drawings, an embodiment of the present disclosure is described in more detail. In describing the present disclosure, an overlapping description is omitted for the same component.

The present disclosure relates to an image encoding and decoding method and device and in more detail, relates to a method and a device for rate control in deep learning-based image encoding and decoding.

The present disclosure proposes a method and a device of adjusting a compression rate in deep learning-based image compression.

In this case, by using a method of adjusting a compression rate proposed in the present invention, a compression rate is adaptively adjusted and convenience is provided to a user.

FIG. 1 is a block diagram of a deep learning-based image processing device according to an embodiment.

In reference to FIG. 1, a deep learning-based image encoder may include an analytic neural network 110, a quantization unit 120 and an entropy encoding unit 140. A deep learning-based image decoder may include an entropy decoding unit 140, a dequantization unit 150 and a synthetic neural network 160.

An analytic neural network 110 may generate a feature map by analyzing an image by using a neural network learned by receiving an image and a generated feature map may be input in a quantization unit 120. In this case, a feature map may be a map including meaningful information in an input image, for example, a contour of an image, luminance, a shape of an object, etc., but is not limited thereto, and it may include every meaningful information required for image processing. For example, when an input image has a RGB color channel, an analytic neural network 110 may generate a feature map emphasizing luminance and/or contour information by performing grayscale conversion on an input image.

A quantization unit 120 may quantize an input feature map to transmit a quantized feature map to an entropy encoding unit. A feature map may be three-dimensional data (or matrix) of values expressed in a floating point. Accordingly, quantization may be performed for expression in a fixed point for efficient entropy encoding.

An entropy encoding unit 130 may generate a bitstream by entropy-encoding an input quantized feature map. A generated bitstream may be stored or transmitted to a deep learning-based image decoder.

An entropy decoding unit 140 may decode an input bitstream to reconstruct a quantized feature map. As an embodiment, context-based adaptive binary arithmetic coding (CABAC) may be used for entropy encoding/decoding. Alternatively, context-based Adaptive Variable-Length Coding (CAVLC) may be used for entropy encoding/decoding. A reconstructed feature map may be transmitted to a dequantization unit 150.

A dequantization unit 150 may dequantize a received feature map and transmit a dequantized feature map (or a reconstructed feature map) to a0 synthetic neural network 160. In this case, when only integerization is performed in a quantization unit 120, dequantization may be omitted in a dequantization unit 150.

A synthetic neural network 160 may synthesize feature maps and reconstruct an image by using a neural network learned from an input dequantized feature map.

Figure 2:
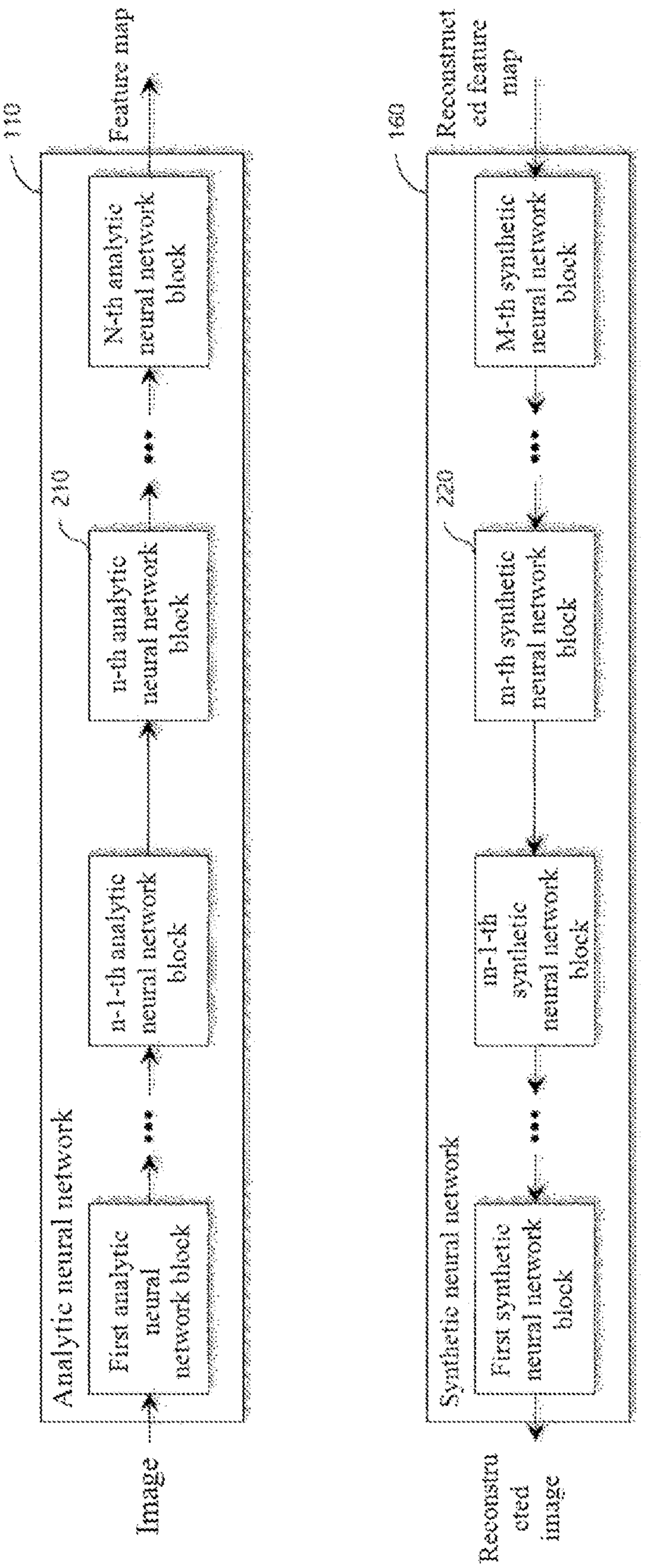
FIG. 2 is a block diagram which illustrates an analytic neural network and a synthetic neural network according to an embodiment.

FIG. 2 is a block diagram which illustrates an analytic neural network and a synthetic neural network according to an embodiment.

In reference to FIG. 2, an analytic neural network 110 and a synthetic neural network 160 of FIG. 1 above are described in more detail.

An analytic neural network 110 may receive an image, analyze an input image based on a learned neural network and output a feature map. In this case, an analytic neural network 110 may include at least one analytic neural network block (or analytic neural network). As an embodiment, an analytic neural network 110 may include a total of N analytic neural network blocks. A n-th analytic neural network block 210 which is any one (arbitrary) analytic neural network block among analytic neural network blocks may include multiple neural network layers. For example, a n-th analytic neural network block 210 may include at least one of a convolution layer, a sampling layer, an activation layer, or a summation layer. In addition, the above-described neural network layers may be connected in series, parallel, serial or parallel, or serial and parallel, and a feature map may be transmitted between each neural network layer. In an example, an analytic neural network block may include a plurality of neural network layers and one analytic neural network block may configure one neural network layer.

A synthetic neural network 160 may receive a reconstructed feature map, synthesize an input feature map based on a learned neural network and output a reconstructed image. In this case, a synthetic neural network 160 may at least one synthetic neural network (or synthetic neural network block). As an embodiment, a synthetic neural network 160 may include a total of M synthetic neural networks. A m-th synthetic neural network block 220 which is any one (arbitrary) analytic neural network block among synthetic neural network blocks may include multiple neural network layers. For example, a m-th synthetic neural network block 220 may include at least one of a convolution layer, a sampling layer, an activation layer, or a summation layer. In addition, the above-described neural network layers may be connected in series, parallel, serial or parallel, or serial and parallel, and a feature map may be transmitted between each neural network layer. In an example, a synthetic neural network block may include a plurality of neural network layers and one synthetic neural network block may configure one neural network layer.

Figure 3:
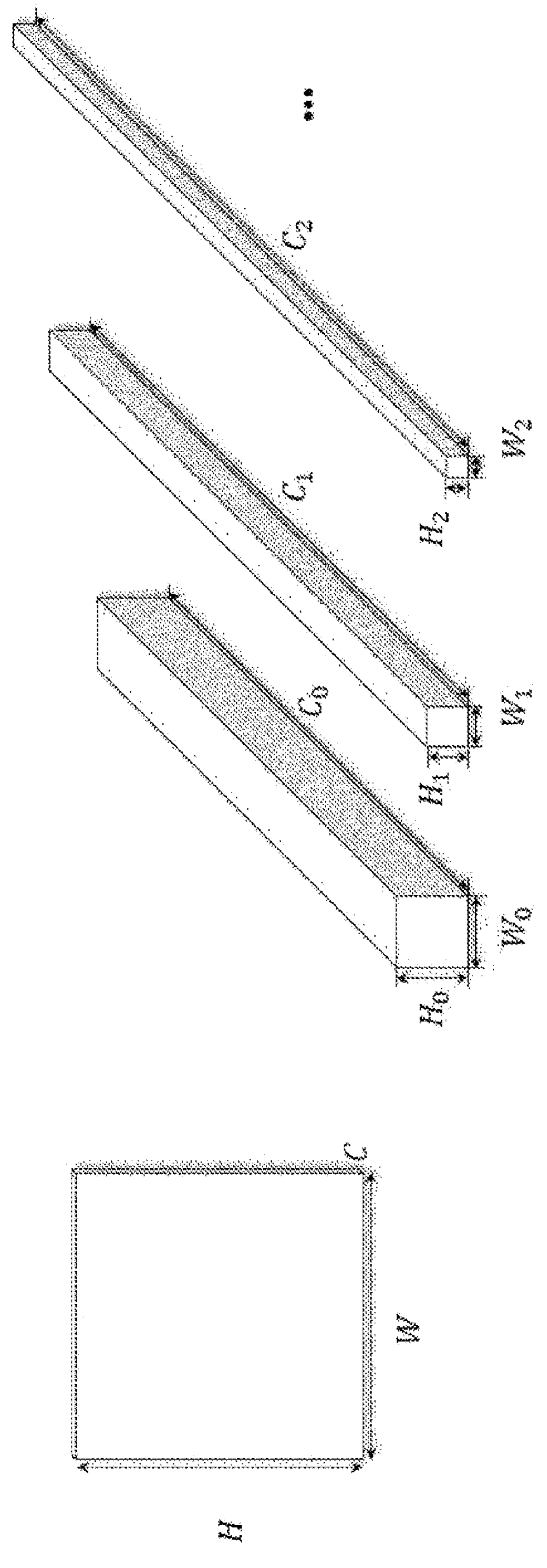
FIG. 3 is a diagram which illustrates a feature map according to an embodiment.

FIG. 3 is a diagram which illustrates a feature map according to an embodiment.

In reference to FIG. 3, input of an analytic neural network 110 or output of a synthetic neural network 160 in FIG. 1 and FIG. 2 described above may be three-dimensional image data as shown in FIG. 3(*a*). Three-dimensional data may be expressed as data having a size of W×H×C. Here, W may be a width (a breadth), H may be a length (a height) and C may be a channel.

Output of an analytic neural network 110 or input of a synthetic neural network 160 may be three-dimensional feature map data as shown in FIG. 3(*b*). As described above, a feature map may be a map including meaningful information in an input image, for example, a contour of an image, luminance, a shape of an object, etc., but is not limited thereto, and it may include every meaningful information required for image processing. Feature map data may be expressed as three-dimensional data having a size of W×H×C. Here, W may be a width (a breadth), H may be a length (a height) and C may be a channel. A feature map may be output in various forms from a neural network layer. For example, a feature map may have a smaller width and/or height size than an input/output image and a greater number of channels than an image.

Figure 4:
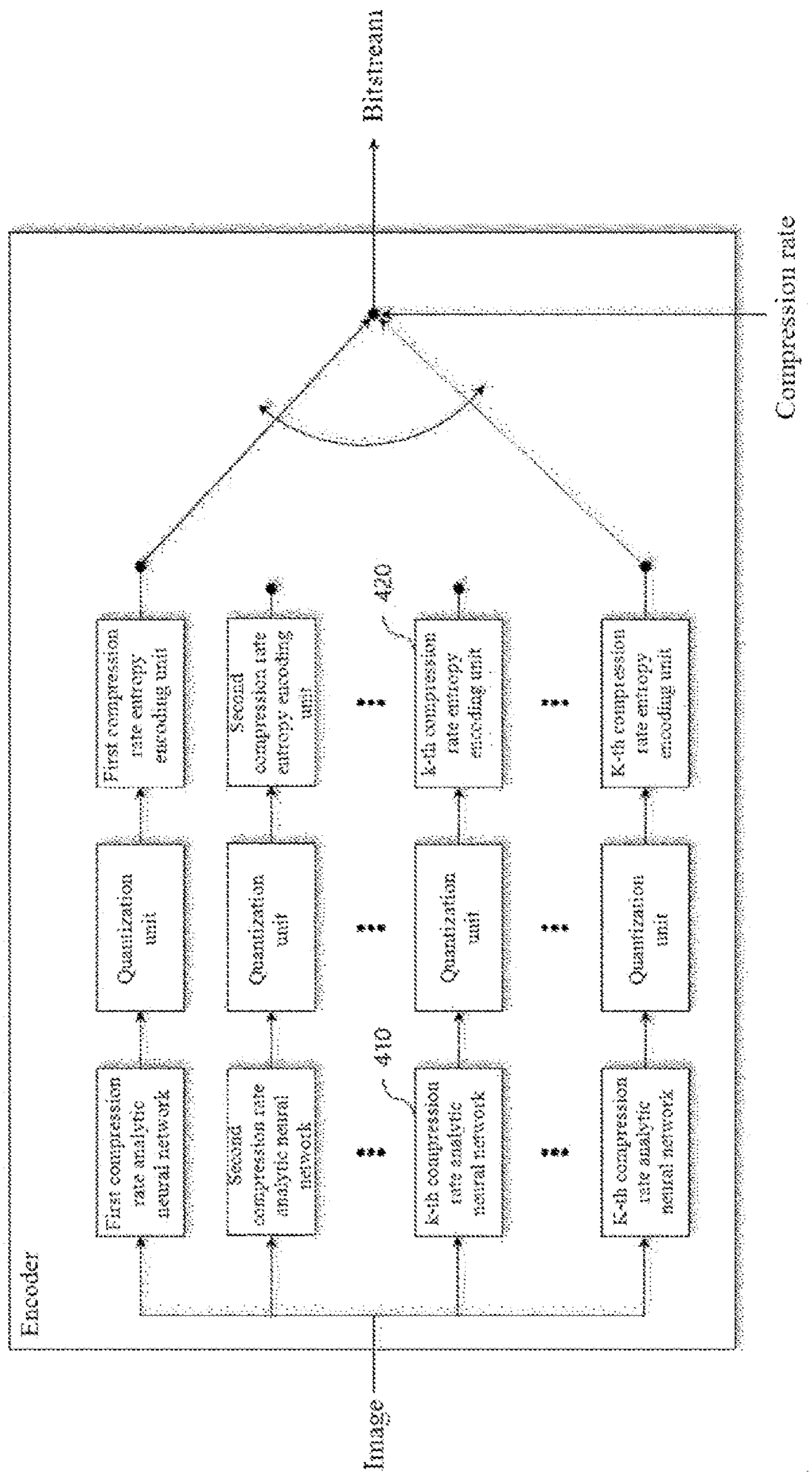
FIG. 4 shows a deep learning-based image encoder for rate control according to an embodiment.

FIG. 4 shows a deep learning-based image encoder for rate control according to an embodiment.

According to an embodiment of the present disclosure, a deep learning-based image encoder for rate control may include a plurality of analytic neural networks. In an example, an analytic neural network may be an analytic neural network 110 in FIG. 1 and FIG. 2 described above. Rate control may be also referred to as compression rate control, transmission rate control, bit rate control, etc.

In reference to FIG. 4, an encoder may use K compression rates and may include K analytic neural networks according to each compression rate. An encoder may include a total of K compression rate encoders as one compression rate encoder including at least one of a k-th compression rate analysis neural network 410, a quantization unit, or a k-th compression rate entropy encoding unit 420. As shown in FIG. 4, a quantization unit and/or an entropy encoding unit may be implemented as a configuration individually included in K compression rate encoders or may be implemented as a configuration directly or indirectly connected to K analytic neural networks as one configuration.

A k-th compression rate analysis neural network 410 and/or a k-th entropy encoding unit 420 of one compression rate encoder may be learned by using a loss function (or algorithm) which minimizes at least one of a bits per pixel (BPP), a Peak Signal-to-Noise Ratio (PSNR) or Structural Similarity Index Measure (SSIM). In this case, a BPP may be measured by dividing a size of a bitstream generated after entropy decoding by the number of pixels of an input image. And, a PSNR and SSIM are a method of measuring objective image quality between an input image and a reconstructed image.

CABAC may be used in a k-th compression rate entropy encoding unit 420. In this case, probability distribution of a context of a quantized feature map may be different per compression rate and accordingly, a probability value used in CABAC may be learned and used differently.

After performing an encoding process by using all compression rate encoders for an input image, an encoder may select and output a bitstream encoded with a compression rate that an input compression rate is the same as or most similar (or closest) to an actual compression rate. Alternatively, an encoder may perform an encoding process for an input image by using a compression rate encoder corresponding to an input compression rate and transmit an output bitstream to a decoder.

Figure 5:
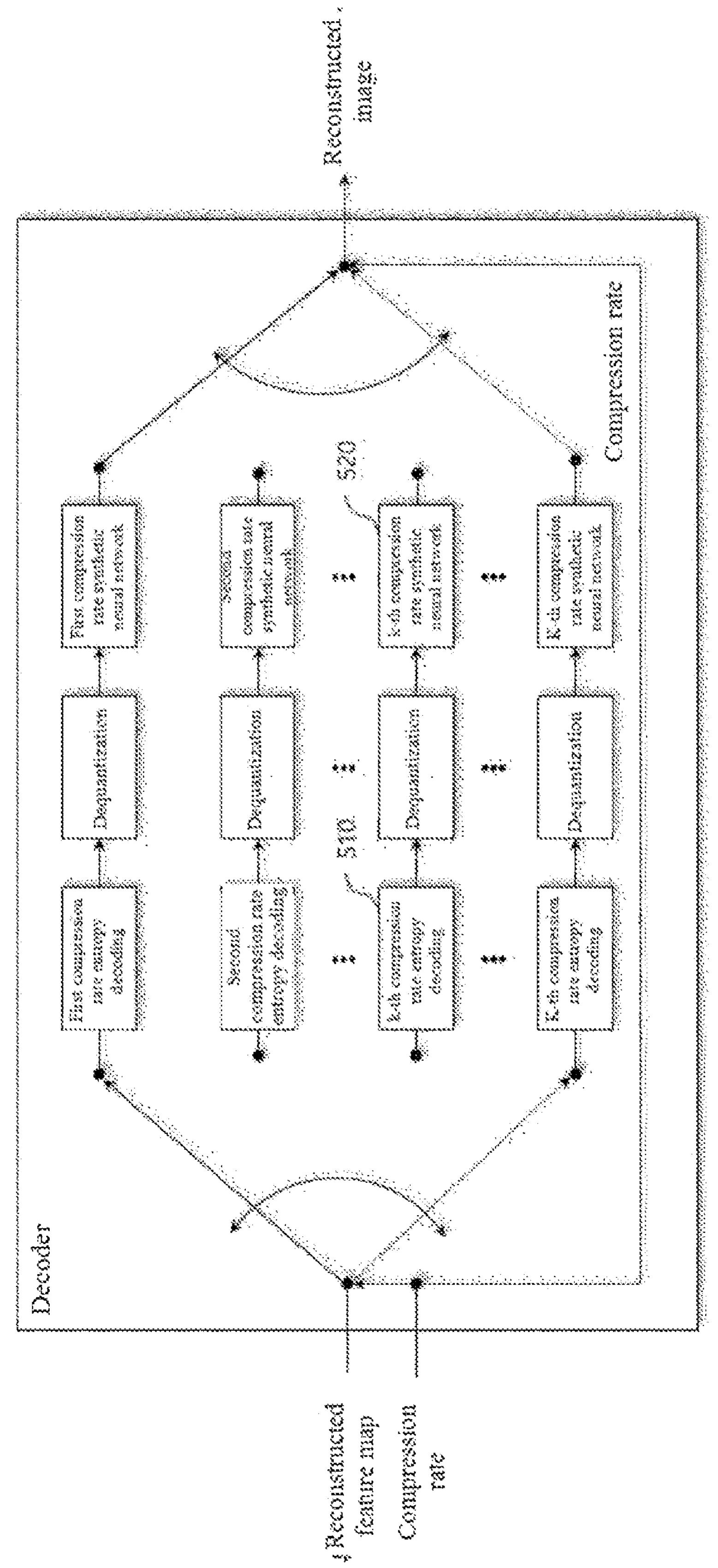
FIG. 5 shows a deep learning-based image encoder for rate control according to an embodiment.

FIG. 5 shows a deep learning-based image encoder for rate control according to an embodiment.

According to an embodiment of the present invention, a deep learning-based image decoder for rate control may include a plurality of synthetic neural networks. In an example, a synthetic neural network may be a synthetic neural network 160 of FIG. 1 and FIG. 2 described above. Rate control may be also referred to as compression rate control, transmission rate control, bit rate control, etc.

In reference to FIG. 5, a decoder may use K compression rates and may include K synthetic neural networks according to each compression rate. A decoder may include a total of K compression rate decoders as one compression rate decoder including at least one of a k-th compression rate entropy decoding unit 510, a dequantizer or a k-th compression rate analytic neural network 510. As shown in FIG. 5, a quantization unit and/or an entropy decoding unit may be implemented as a configuration individually included in K compression rate decoders or may be implemented as a configuration directly or indirectly connected to K analytic neural networks as one configuration.

A k-th entropy decoding unit 510 and/or a k-th compression rate synthetic neural network 520 of one compression rate decoder may be learned by using a loss function which minimizes at least one of BPP, PSNR, or SSIM at a designated compression rate. In addition, it may be learned simultaneously with a k-th compression rate encoder described in FIG. 4 above.

After confirming a compression rate included in a bitstream, a decoder may reconstruct an image by using a compression rate decoder corresponding to (or equivalent to) a compression rate.

Figure 6:
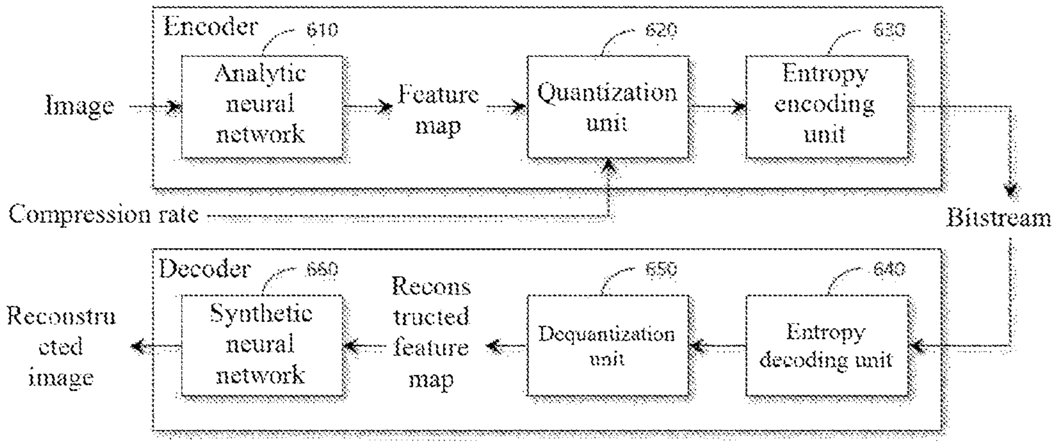
FIG. 6 shows a block diagram of a deep learning-based image encoder and decoder for rate control according to an embodiment.

FIG. 6 shows a block diagram of a deep learning-based image encoder and decoder for rate control according to an embodiment.

In reference to FIG. 6, an encoder may include an analytic neural network 610, a quantization unit 620, and an entropy encoding unit 630 and a decoder may include an entropy decoding unit 640, a dequantization unit 650 and a synthetic neural network 660. As an embodiment, an analytic neural network 610 may be an analytic neural network described in FIG. 1 to FIG. 5 above and a synthetic neural network 660 may be a synthetic neural network described in FIG. 1 to FIG. 5 above. A method described in FIG. 1 to FIG. 5 above may be substantially equally applied to this embodiment and a related overlapping description is omitted.

An analytic neural network 610 may receive an image and generate a feature map by analyzing an image with a deep learning-based neural network. An analytic neural network 610 may transmit a generated feature map to a quantization unit 620. As an embodiment, a neural network may be a neural network learned through deep learning.

A quantization unit 620 may receive a feature map and a compression rate, perform quantization and transmit a quantized feature map to an entropy encoding unit 630. In this case, a compression rate may be a value proportional to a quantization size (or a quantization step size or a quantization parameter). Alternatively, a variety of quantization sizes may be stored in a table and index information corresponding to a quantization size may correspond to a compression rate. In addition, a compression rate (or compression rate information) may be included in a bitstream and transmitted to a decoder. In an example, compression rate information may include an index indicating a specific quantization step size in a predefined quantization step size table. An entropy encoding unit 630 may generate a bitstream by performing entropy encoding for an input quantized feature map.

An entropy decoding unit 640 may decode an input bitstream, reconstruct a feature map and a compression rate and transmit them to a dequantization unit 650. A dequantization unit 650 may generate a dequantized feature map by performing dequantization by using an input feature map and a compression rate. A generated dequantized feature map may be transmitted to a synthetic neural network 660. A synthetic neural network 660 may synthesize a feature map and reconstruct an image by using a neural network that an input feature map is learned by deep learning.

Figure 7:
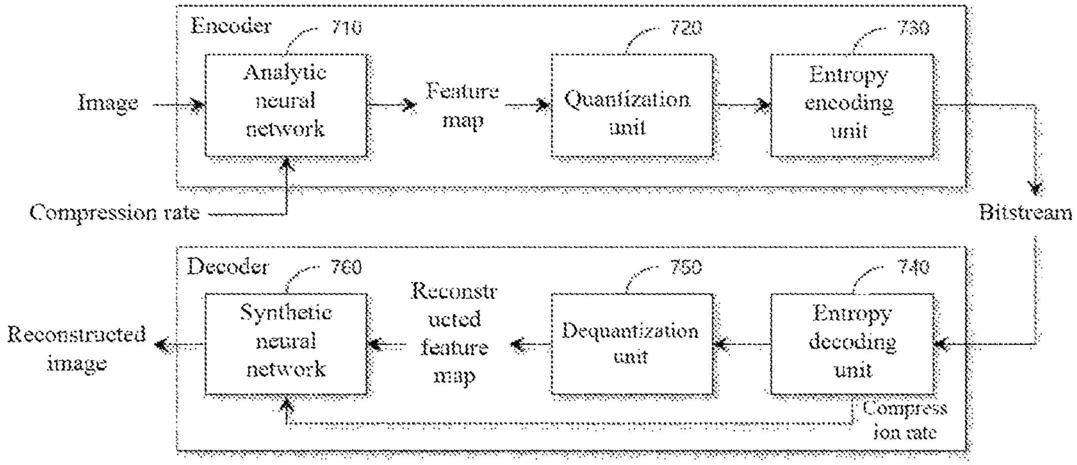
FIG. 7 shows a block diagram of a deep learning-based image encoder and decoder for rate control according to an embodiment.

FIG. 7 shows a block diagram of a deep learning-based image encoder and decoder for rate control according to an embodiment.

In reference to FIG. 7, an encoder may include an analytic neural network 710, a quantization unit 720, and an entropy encoding unit 730 and a decoder may include an entropy decoding unit 740, a dequantization unit 750 and a synthetic neural network 760. As an embodiment, an analytic neural network 710 may be an analytic neural network described in FIG. 1 to FIG. 5 above and a synthetic neural network 760 may be a synthetic neural network described in FIG. 1 to FIG. 5 above. A method described in FIG. 1 to FIG. 5 above may be substantially equally applied to this embodiment and a related overlapping description is omitted.

In this embodiment, an analytic neural network 710 may receive a compression rate together with an image. An analytic neural network 710 may transmit a feature map to a quantization unit 720 after analyzing it by using a deep learning-based neural network based on an input image and compression rate. In this case, an analytic neural network 710 may output a feature map corresponding to a compression rate. Compression rate information may be included in a bitstream and transmitted to a decoder. A quantization unit 720 may receive a feature map, perform quantization and transmit a quantized feature map to an entropy encoding unit 730. An entropy encoding unit 730 may generate a bitstream by encoding an input quantized feature map. The bitstream may include compression rate information.

An entropy decoding unit 740 may decode an input bitstream, reconstruct a feature map and transmit it to a dequantization unit 750. In addition, an entropy decoding unit 740 may reconstruct a compression rate and transmit it to a synthetic neural network 760. A dequantization unit 750 may dequantize an input feature map to generate a dequantized feature map. A generated dequantized feature map may be transmitted to a synthetic neural network 760. A synthetic neural network 760 may synthesize a feature map and reconstruct an image by using a neural network learned by deep learning based on an input feature map and compression rate.

Figure 8:
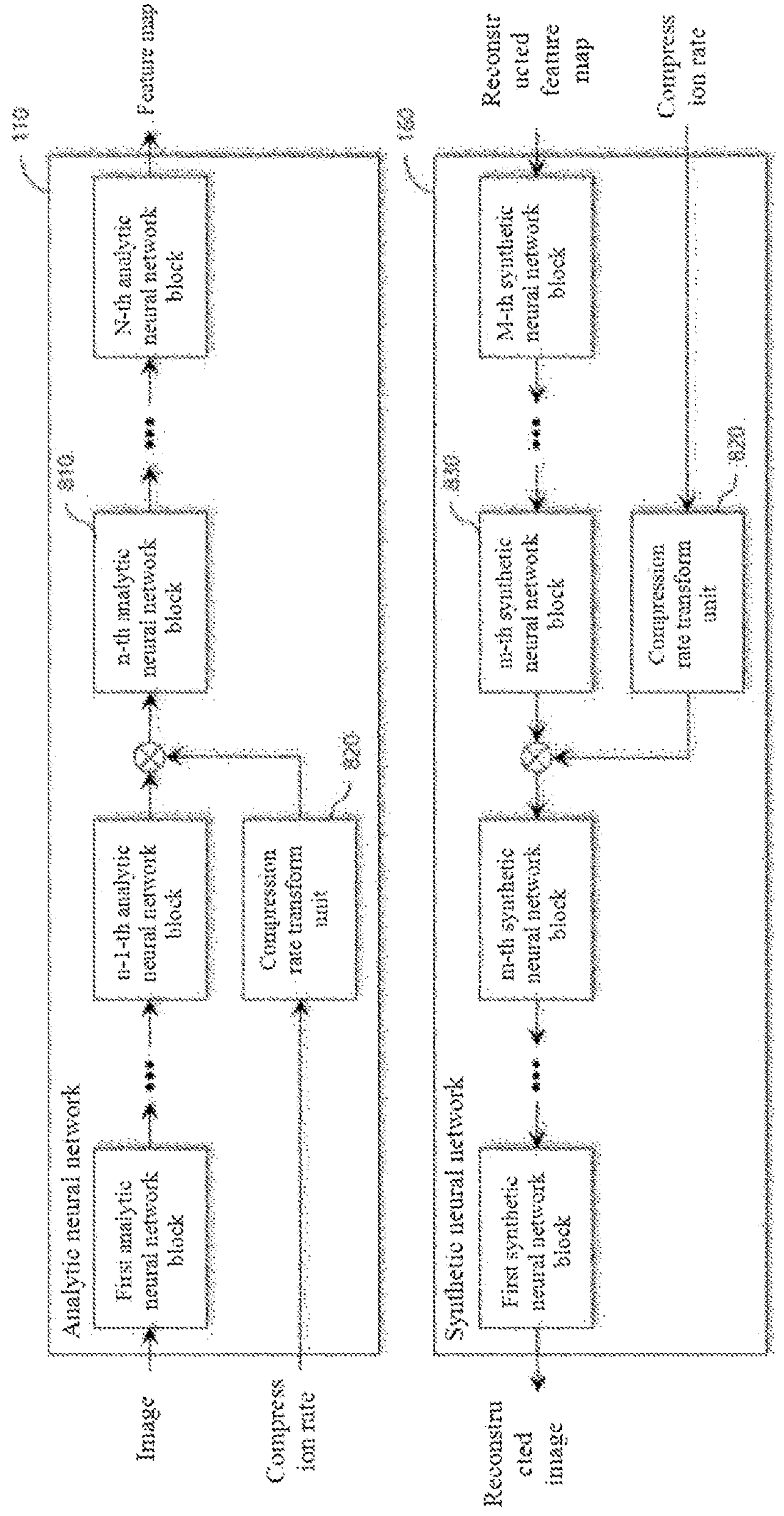
FIG. 8 is a block diagram which illustrates an analytic neural network and a synthetic neural network according to an embodiment.

FIG. 8 is a block diagram which illustrates an analytic neural network and a synthetic neural network according to an embodiment.

In reference to FIG. 8, an analytic neural network 110, 610, 710 and a synthetic neural network 160, 660, 760 of FIG. 1 to FIG. 7 above are described in more detail.

An analytic neural network 110 may receive an image, analyze an input image based on a learned neural network and output a feature map. In this case, an analytic neural network 110 may include at least one analytic neural network block (or analytic neural network). As an embodiment, an analytic neural network 110 may include a total of N analytic neural network blocks. A n-th analytic neural network block 810 which is any one (arbitrary) analytic neural network block among analytic neural network blocks may include multiple neural network layers.

For example, a n-th analytic neural network block 810 may include at least one of a convolution layer, a sampling layer, an activation layer or a summation layer. In addition, the above-described neural network layers may be connected in series, parallel, serial or parallel, or serial and parallel, and a feature map may be transmitted between each neural network layer.

A compression rate transform unit 820 may transform an input compression rate. As an embodiment, a compression rate transform unit 820 may transform a compression rate to generate a compression rate map (or matrix). A generated compression rate map may be multiplied with an output feature map of a n−1-th analytic neural network block. In this case, a compression rate map may be two-dimensional data (or vector) or three-dimensional data (or matrix). When a compression rate map is a vector, each channel of an output feature map of a n−1-th analytic neural network may be multiplied by a component of a vector. When a compression rate map is a matrix, a multiplication operation may be applied to an output feature map per element. Alternatively, a compression rate transform unit 820 may receive a scalar value as a compression rate and transform it into a vector or three-dimensional data through a neural network. In this case, for a neural network used for compression rate transform, an analytic neural network and a synthetic neural network may be simultaneously learned.

A synthetic neural network 160 may receive a reconstructed feature map, synthesize an input feature map based on a learned neural network and output a reconstructed image. In this case, a synthetic neural network 160 may at least one synthetic neural network (or synthetic neural network block). As an embodiment, a synthetic neural network 160 may include a total of M synthetic neural network blocks. A m-th synthetic neural network block 830 which is any one (arbitrary) analytic neural network block among synthetic neural network blocks may include multiple neural network layers.

For example, a m-th synthetic neural network block 830 may include at least one of a convolution layer, a sampling layer, an activation layer, or a summation layer. In addition, a neural network layers may be connected to each other in series or parallel or in series and parallel and a feature map may be transmitted between each neural network layer. In addition, a feature map output (or generated) from a m-th synthetic neural network block 830 may be multiplied with a compression rate map generated from a compression rate transform unit 820. A multiplied feature map may be input to a m−1-th synthetic neural network (i.e., the next synthetic neural network).

Figure 9:
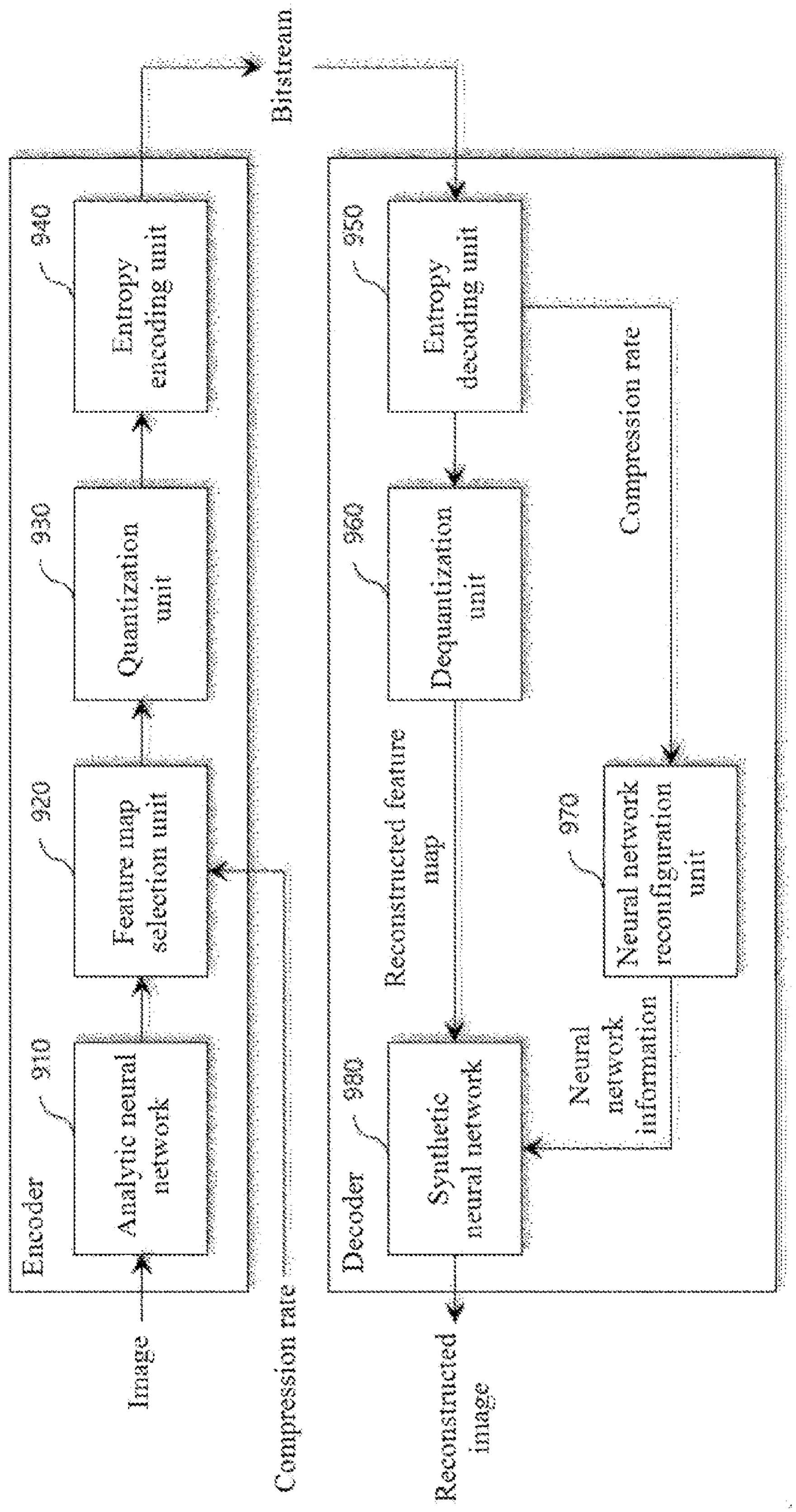
FIG. 9 shows a block diagram of a deep learning-based image encoder and decoder for rate control according to an embodiment.

FIG. 9 shows a block diagram of a deep learning-based image encoder and decoder for rate control according to an embodiment.

In reference to FIG. 9, an encoder may include an analytic neural network 910, a feature map selection unit 920, a quantization unit 930 and an entropy encoding unit 940. In addition, a decoder may include a synthetic neural network 980, a neural network reconfiguration unit 970, a dequantization unit 960 and an entropy decoding unit 950. As an embodiment, an analytic neural network 610 may be an analytic neural network described in FIG. 1 to FIG. 8 above and a synthetic neural network 660 may be a synthetic neural network described in FIG. 1 to FIG. 8 above. A method described in FIG. 1 to FIG. 8 above may be substantially equally applied to this embodiment and a related overlapping description is omitted.

An analytic neural network 910 may generate a feature map by receiving an image. In this case, a feature map may be one or a plurality of feature maps. Each of a plurality of feature maps may have a different width, height, number of channel, bit depth, etc. A generated feature map may be transmitted to a feature map selection unit 920.

A feature map selection unit 920 may select one or at least one feature map by using an input feature map and a compression rate and transmit a selected feature map to a quantization unit 930. A compression rate may be transmitted to an entropy encoding unit 940 and entropy-encoded, and it may be included in a bitstream and transmitted to a decoder. A quantization unit 930 may quantize an input feature map and transmit it to an entropy encoding unit 940.

An entropy encoding unit 940 may generate a bitstream by performing entropy encoding for an input quantized feature map.

An entropy decoding unit 950 may reconstruct a quantized feature map by performing entropy decoding for a transmitted bitstream. A reconstructed feature map may be transmitted to a dequantization unit 960. In addition, an entropy decoding unit 950 may acquire a compression rate by performing entropy decoding for a bitstream. A dequantization unit 960 may dequantize a transmitted feature map to reconstruct a feature map and a reconstructed feature map may be transmitted to a synthetic neural network 980.

A neural network reconfiguration unit 970 may receive a compression rate, reconfigure a stored neural network and transmit neural network information to a synthetic neural network 980. Here, a neural network reconfiguration may be performed by excluding some (or the specific number) of synthetic neural network blocks from the entire synthetic neural network according to an input compression rate. For example, a neural network reconfiguration unit 970 may store a plurality of learned neural networks. And, among neural networks stored according to a compression rate received from an entropy decoding unit 960, some neural networks may be transmitted to a synthetic neural network 960. A neural network reconfiguration unit 970 may determine a neural network used for synthesizing a feature map according to a compression rate and in an example, it may store a neural network mapping table according to a compression rate.

Figure 10:
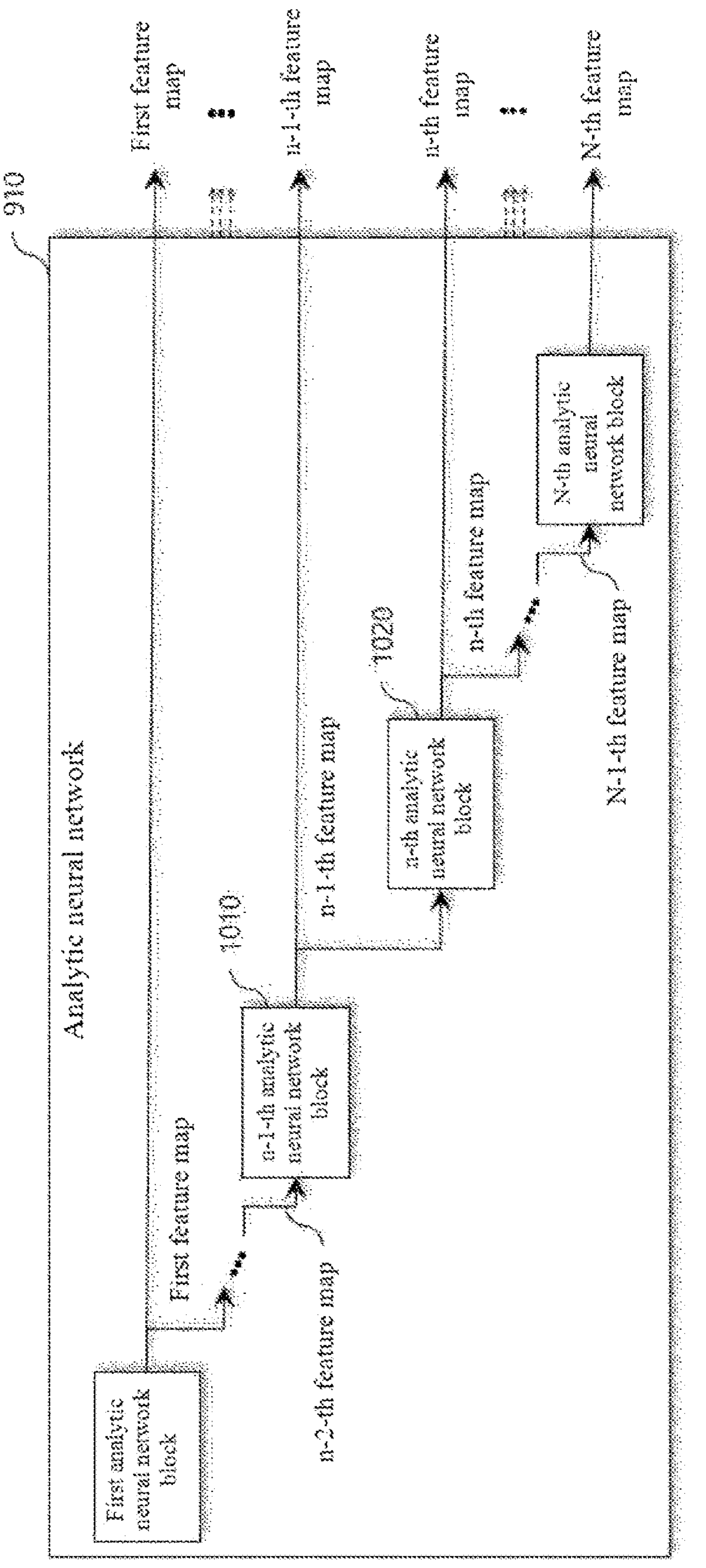
FIG. 10 shows an example of an analytic neural network according to an embodiment.

FIG. 10 shows an example of an analytic neural network according to an embodiment.

In reference to FIG. 10, an analytic neural network 910 may be an analytic neural network described in FIG. 1 to FIG. 9 above. A related overlapping description is omitted. An analytic neural network 910 may include a plurality of neural network blocks. As an embodiment, an analytic neural network 910 may include a total of N analytic neural network blocks. In this case, a neural network block may include a plurality of neural network layers. Each neural network layer may be connected in series, parallel, series or parallel or series and parallel.

Each of N analytic neural network blocks included in an analytic neural network 910 may generate a feature map. All or part of generated feature maps may be transmitted to a feature map selection unit 920.

A current analytic neural network block may receive a previous feature map generated in a previous analytic neural network block and generate and output a current feature map based on a received previous feature map. An output current feature map may be transmitted to a feature map selection unit 920 or may be transmitted to the next analytic neural network block. In other words, a n−1-th analytic neural network block 1010 may receive a n−2-th feature map and generate a n−1-th feature map based on it. A generated n−1-th feature map may be transmitted to a feature map selection unit 920. In addition, a generated n−1-th feature map may be transmitted to a n-th analytic neural network block 1020.

A n-th analytic neural network block 1020 may receive a n−1-th feature map and generate a n-th feature map. A generated n-th feature map may be transmitted to a feature map selection unit 920 or may be transmitted to the next analytic neural network block.

Figure 11:
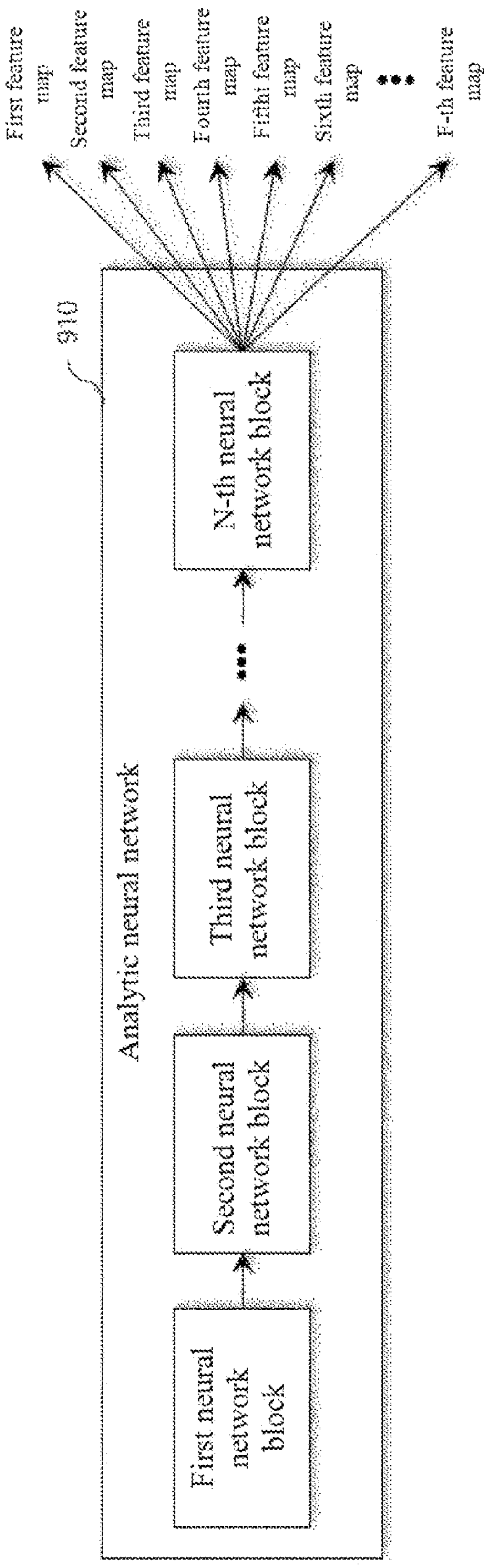
FIG. 11 shows an example of an analytic neural network according to an embodiment.

FIG. 11 shows an example of an analytic neural network according to an embodiment.

In reference to FIG. 11, an analytic neural network 910 may be an analytic neural network described in FIG. 1 to FIG. 10 above. A related overlapping description is omitted. An analytic neural network 910 may include a plurality of neural network blocks. As an embodiment, an analytic neural network 910 may include a total of N analytic neural network blocks. In this case, a neural network block may include a plurality of neural network layers. Each neural network layer may be connected in series, parallel, series or parallel or series and parallel.

At least one feature map may be output from a N-th analytic neural network block which is a last analytic neural network block of an analytic neural network 910. In an example, a weight and a height size of an output feature map may be the same and the number of channels may be different.

In addition, in an embodiment, each feature map may be mapped to a specific compression rate. Accordingly, during learning based on deep learning, it is possible to learn by backpropagating loss corresponding to a designated compression rate for all feature maps.

Figure 12:
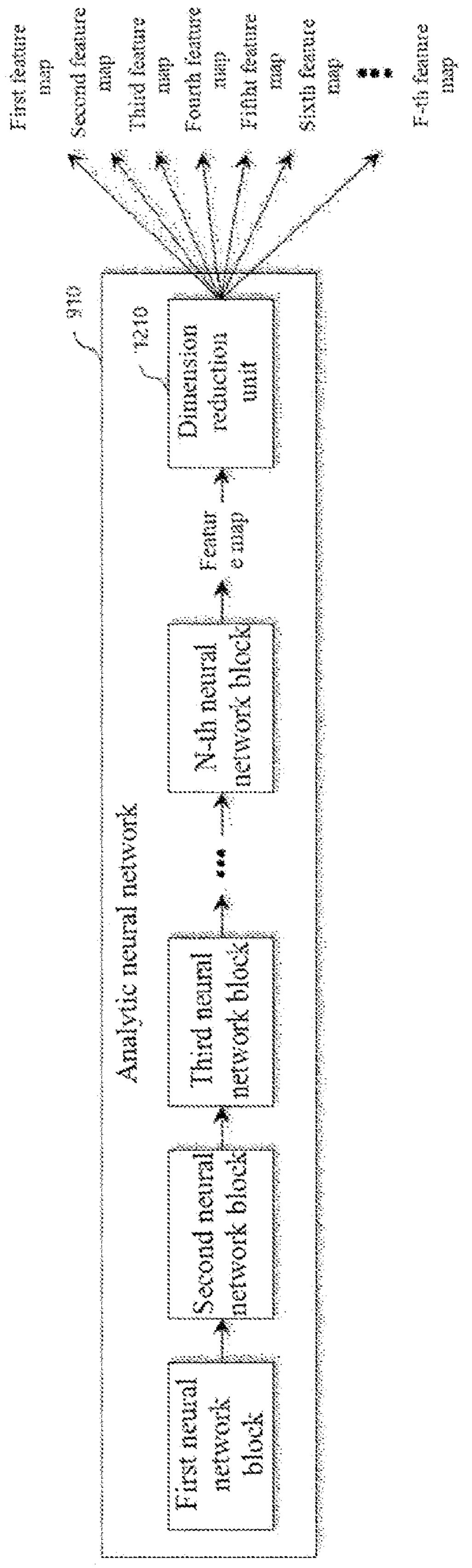
FIG. 12 shows an example of an analytic neural network according to an embodiment.

FIG. 12 shows an example of an analytic neural network according to an embodiment.

In reference to FIG. 12, an analytic neural network 910 may be an analytic neural network described in FIG. 1 to FIG. 11 above. A related overlapping description is omitted. An analytic neural network 910 may include a plurality of neural network blocks. As an embodiment, an analytic neural network 910 may include a total of N analytic neural network blocks. In this case, a neural network block may include a plurality of neural network layers. Each neural network layer may be connected in series, parallel, series or parallel or series and parallel.

An analytic neural network 910 may generate at least one feature map to transmit it to a feature map selection unit 920. An analytic neural network 910 may have a total of N analytic neural network blocks and each analytic neural network block may include one or a plurality of neural network layers. In addition, a plurality of neural network layers may be connected in various combinations in series and/or in parallel and a feature map may be transmitted between layers.

In a last analytic neural network block of an analytic neural network, one feature map may be generated. A generated feature map may be transmitted to a dimension reduction unit 1210. A dimension reduction unit 1210 may perform dimension reduction by analyzing a received feature map. In this case, a variety of notified machine learning methods such as PCA (Principal Components Analysis) may be used for dimension reduction. Alternatively, a dimension reduction unit 1210 may perform dimension reduction by using a learned neural network. In this case, a feature map corresponding to a variety of compression rates may be generated by adjusting a ratio of dimension reduction. A feature map generated in a dimension reduction unit 1210 may be transmitted to a feature map selection unit 920.

Figure 13:
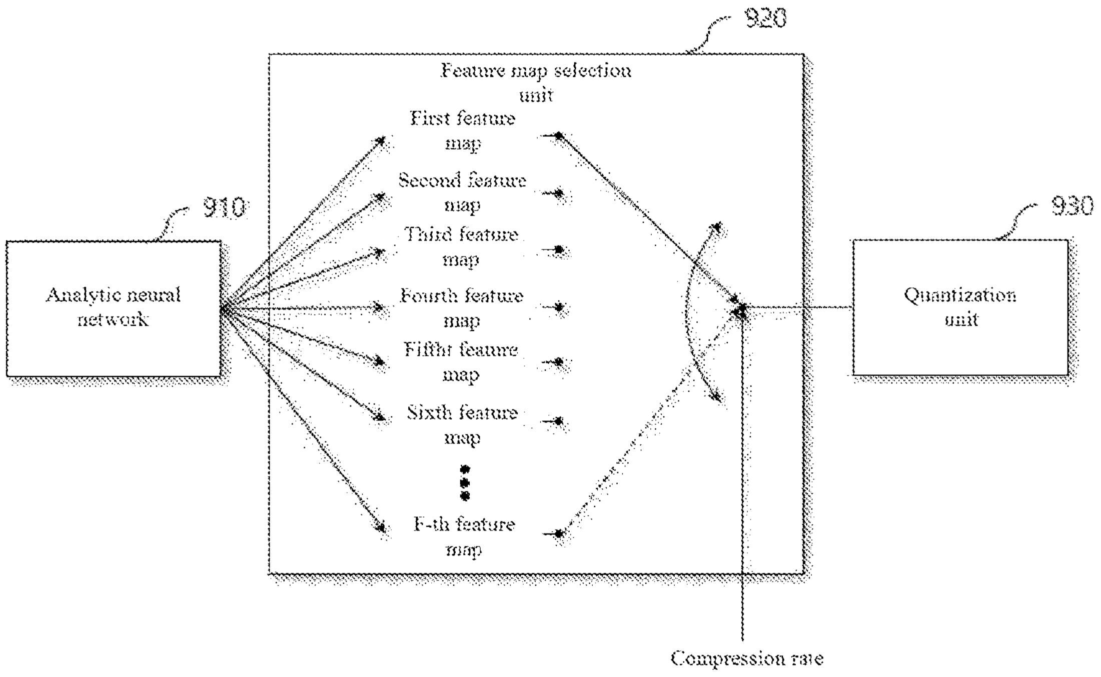
FIG. 13 shows an example of a feature map selection unit according to an embodiment.

FIG. 13 shows an example of a feature map selection unit according to an embodiment.

In reference to FIG. 13, a feature map selection unit 920 may be a feature map selection unit 920 described in FIG. 9 above. A related overlapping description is omitted. A feature map selection unit 920 may select one of a plurality of input feature maps by using an input compression rate and transmit a selected feature map to a quantization unit 930. Here, each feature map may be a feature map corresponding to a specific compression rate.

In this case, an input compression rate may be a scalar value. Here, a compression rate may be an index of a lookup table. Alternatively, an index of a lookup table may refer to an index of a feature map.

Alternatively, a feature map selection unit 920 may scale an input compression rate to transform it into another value and use a transformed value to select a feature map. An input compression rate may be transmitted to a decoder through an entropy encoding unit 940.

Hereinafter, a deep learning-based image coding method and device using a feature map prediction neural network will be described.

Figure 14:
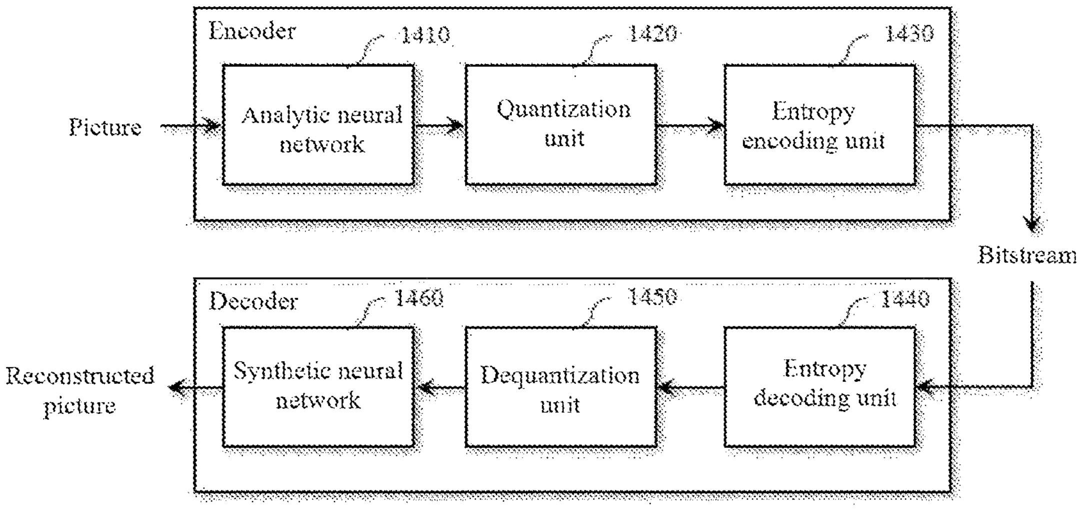
FIG. 14 shows a block diagram of a deep learning-based image encoder and decoder according to an embodiment.

FIG. 14 shows a block diagram of a deep learning-based image encoder and decoder according to an embodiment.

In reference to FIG. 14, a deep learning-based image encoder may include an analytic neural network 1410, a quantization unit 1420 and an entropy encoding unit 1430 and a deep learning-based image decoder may include an entropy decoding unit 1440, a dequantization unit 1450 and a synthetic neural network 1460.

An analytic neural network 1410 may generate a feature map by analyzing an input picture. An analytic neural network 1410 may transmit a generated feature map to a quantization unit 1420.

A quantization unit 1420 may quantize an input feature map. A quantization unit 1420 may transmit a quantized feature map to an entropy encoding unit 1430. Here, a quantization unit 1420 may scale an input feature map by using a quantization step (or a quantization parameter). Alternatively, a quantization unit 1420 may scale an input feature map by a quantization step mapped to a quantization parameter input by a user. Alternatively, a quantization unit 1420 may transform a feature map expressed in a floating point into an integer type through an operation such as rounding off, rounding up, rounding down, etc.

An entropy encoding unit 1430 may rearrange an input quantized feature map from a three-dimensional matrix into a one-dimensional vector and entropy-encodes each element to generates a bitstream. Here, context-based adaptive binary arithmetic coding (CABAC) or context-based adaptive variable-length coding (CAVLC) may be used for entropy encoding. An entropy encoding unit 1430 may transmit a generated bitstream to a decoder through a communication channel.

An entropy decoding unit 1440 may entropy-decode an input bitstream by using CABAC or CAVLC to reconstruct a feature map in a form of a one-dimensional vector. A feature map may be generated by rearranging a reconstructed one-dimensional vector into a three-dimensional matrix. A generated feature map may be transmitted to a dequantization unit 1450.

A dequantization unit 1450 may dequantize an input reconstructed feature map and transmit it to a synthetic neural network 1460. Here, dequantization may refer to scaling by using a quantization step. Alternatively, dequantization may refer to scaling by using a quantization step mapped to a quantization parameter transmitted through a bitstream. Alternatively, a dequantization unit 1450 may omit dequantization without performing it.

A synthetic neural network 1460 may synthesize an input reconstructed feature map by using a neural network and reconstruct and output a picture.

Figure 15:
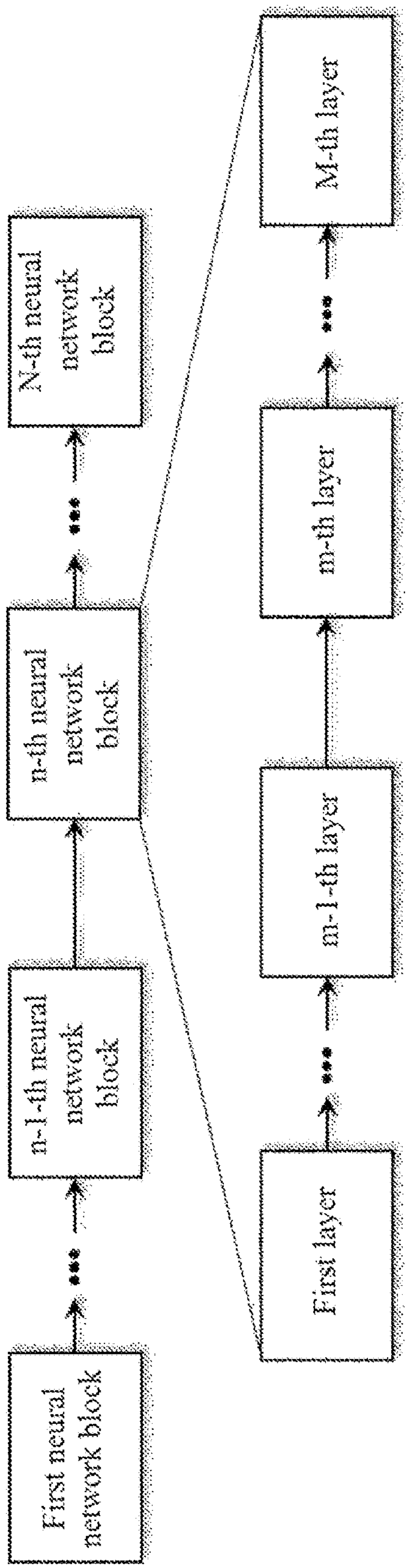
FIG. 15 shows an example of a structure of a neural network according to an embodiment.

FIG. 15 shows an example of a structure of a neural network according to an embodiment.

In reference to FIG. 15, an analytic neural network 1410 and a synthetic neural network 1460 described in FIG. 14 above may have a structure of a neural network as shown in FIG. 15. In addition, an analytic neural network 1410 and a synthetic neural network 1460 may include a plurality of neural network blocks. In addition, one neural network block may include at least one neural network layer. Here, a neural network layer may be any one of a variety of neural network layers such as a convolution layer, a correlation layer, a sampling layer, a pooling layer, a transform layer, a shuffle layer, a summation layer, a difference layer, a stack layer, etc.

In addition, in an embodiment, a type of a neural network layer included in a neural network block may be different. Alternatively, a neural network layer included in a neural network block may be repetitively connected by configuring layers having the same configuration as one set. Here, the above-described neural network layers may be connected in series, parallel, series or parallel or series and parallel. And, a connection between neural network layers may refer to a connection which is input to a layer after output of a layer. And, data transmitted between a layer and a layer is a feature map and a feature map may be output and input of a neural network layer.

An analytic neural network 1410 and a synthetic neural network 1460 may be repetitively connected to a neural network block having a neural network layer having the same configuration. In addition, an analytic neural network and a synthetic neural network may include the same number of neural network blocks. In addition, a type of a neural network block of an analytic neural network 1410 and a synthetic neural network 1460 may be configured symmetrically.

In other words, since analysis and synthesis may functionally refer to inverse transform, a neural network block may be configured symmetrically. In other words, if a convolution layer is used in an analytic neural network, a correlation layer may be used in a synthetic neural network. Alternatively, if a downsampling layer is used in an analytic neural network, an upsampling layer may be used in a synthetic neural network.

In this case, an analytic neural network 1410 and a synthetic neural network 1460 may include the same number of neural network layers. Alternatively, a synthetic neural network may include fewer layers for a compression rate. Alternatively, a plurality of analytic neural networks may be connected in parallel for efficient encoding.

Figure 16:
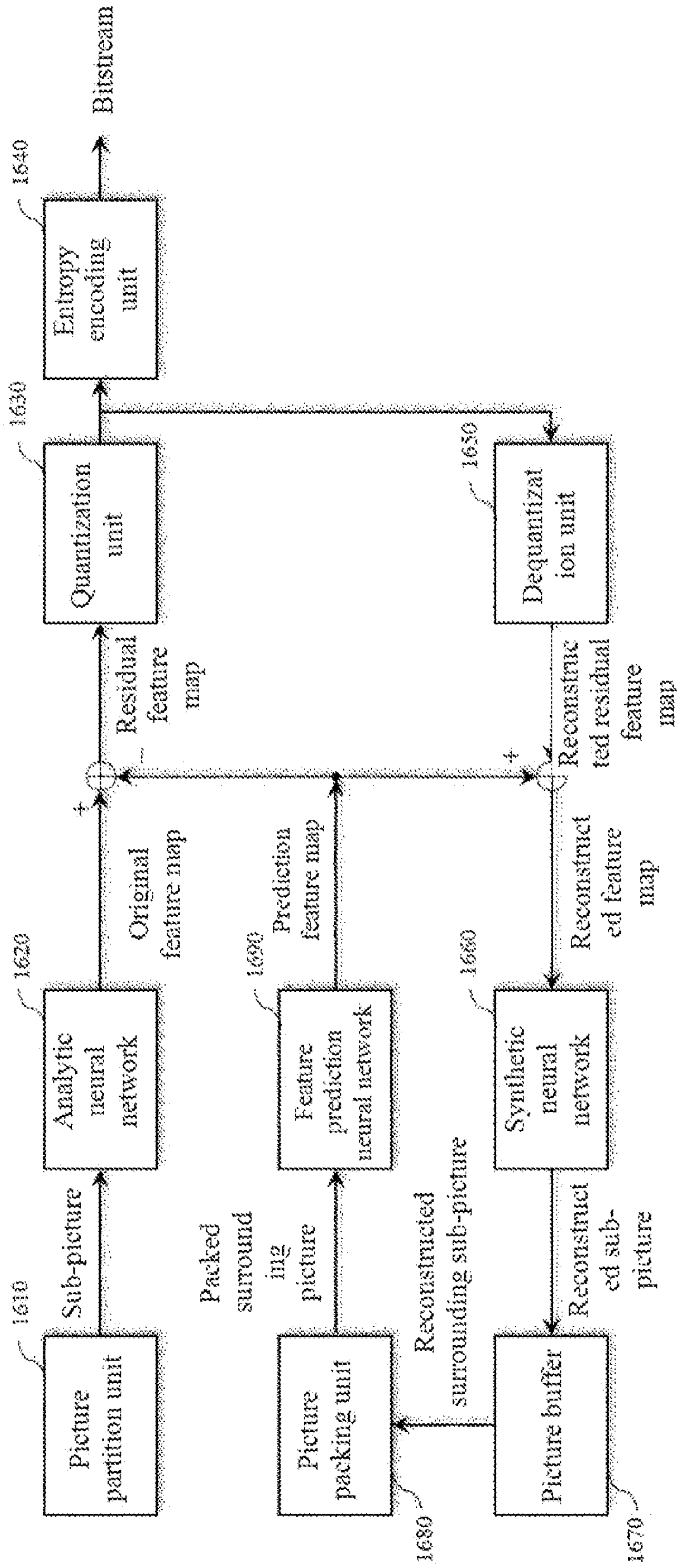
FIG. 16 shows an example of a block diagram of a deep learning-based image encoder according to an embodiment.

FIG. 16 shows an example of a block diagram of a deep learning-based image encoder according to an embodiment.

In reference to FIG. 16, a deep learning-based image encoder may include a picture partition unit 1610, an analytic neural network 1620, a quantization unit 1630, an entropy encoding unit 1640, a dequantization unit 1650, a synthetic neural network 1660, a picture buffer 1670, a picture packing unit 1680 and a feature prediction neural network 1690.

A picture partition unit 1610 may partition one picture into a plurality of sub-pictures. A partitioned sub-picture may be input to an analytic neural network 1620.

An analytic neural network 1620 may generate a feature map by analyzing an input sub-picture. A generated feature map may be differentiated from a prediction feature map, output of a feature prediction neural network 1690, to generate a residual feature map and transmit it to a quantization unit 1630.

A quantization unit 1630 may quantize an input residual feature map to generate a quantized feature map. Here, quantization may refer to scaling an input feature map with a quantization step. Alternatively, it may refer to scaling with a quantization step mapped to a quantization parameter input by a user. Alternatively, it may refer to transforming a feature map expressed in a floating point into an integer type through an operation such as rounding off, rounding up, rounding down, etc. A quantized feature map may be transmitted to an entropy encoding unit 1640. In addition, parameters used for quantization may be transmitted to a decoder through an entropy encoding unit 1640. In addition, a quantized feature map may be transmitted to a dequantization unit 1650.

An entropy encoding unit 1640 may rearrange an input quantized feature map from a three-dimensional matrix into a one-dimensional vector and entropy-encodes each element to generates a bitstream. Here, context-based adaptive binary arithmetic coding (CABAC) or context-based adaptive variable-length coding (CAVLC) may be used for entropy encoding. A generated bitstream may be transmitted to a decoder through a communication channel.

A dequantization unit 1650 may dequantize an input quantized feature map to reconstruct a residual feature map. Here, dequantization may refer to scaling by using a quantization step. Alternatively, it may refer to scaling with a quantization step mapped to a quantization parameter transmitted through a bitstream. Alternatively, a dequantization unit 1650 may omit dequantization without performing it. A reconstructed residual feature map may be summed with a prediction feature map, output of a prediction feature map, to generate a reconstructed feature map. A generated reconstructed feature map may be transmitted to a synthetic neural network 1660.

A synthetic neural network 1660 may use a neural network to synthesize an input reconstructed feature map and reconstruct a picture (or a sub-picture). A reconstructed picture may be transmitted to a picture buffer 1670.

A picture buffer 1670 may store at least one picture (or sub-picture).

A picture packing unit 1680 may receive at least one picture (or sub-picture) from a picture buffer and pack a received picture to transmit it to a feature prediction neural network 1690. Here, packing may refer to a process of packing to input a plurality of pictures or sub-pictures to a feature prediction neural network 1690.

A feature prediction neural network 1690 may perform original feature map prediction by inputting an input packed picture (or sub-picture) to a neural network. A feature prediction neural network 1690 may be learned so that a total sum of difference values between an original feature map and a prediction feature map becomes small. Alternatively, a feature prediction neural network 1690 may use the same neural network as an analytic neural network 1620. Alternatively, a prediction feature map may have the same shape as an original feature map.

Figure 17:
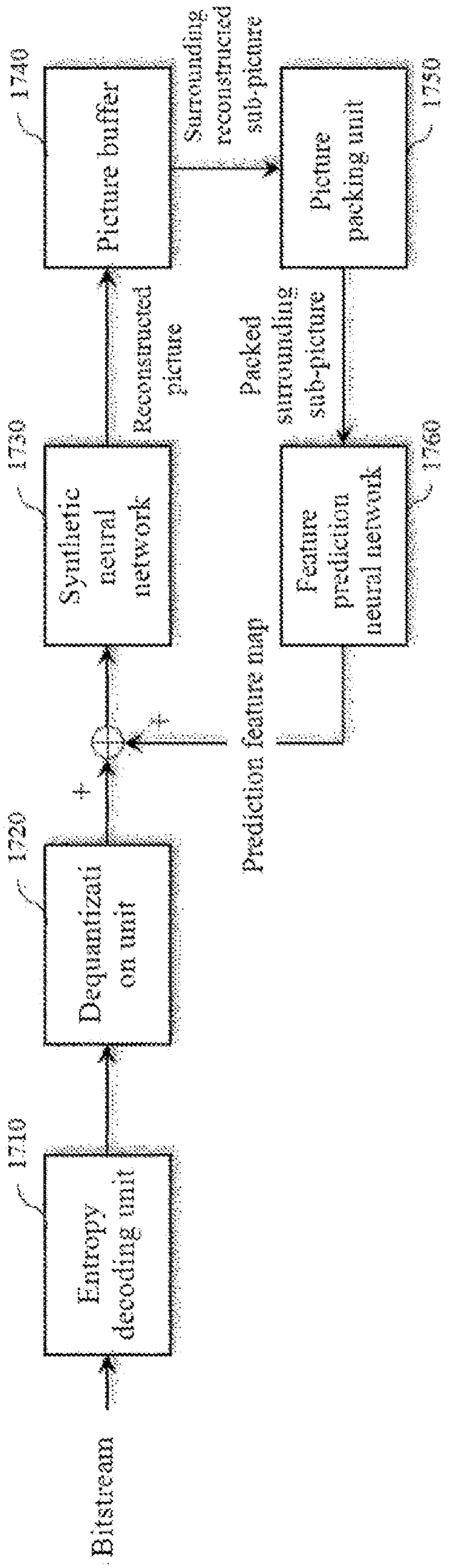
FIG. 17 shows an example of a block diagram of a deep learning-based image decoder according to an embodiment.

FIG. 17 shows an example of a block diagram of a deep learning-based image decoder according to an embodiment.

In reference to FIG. 17, a deep learning-based image decoder may include an entropy decoding unit 1710, a dequantization unit 1720, a synthetic neural network 1730, a picture buffer 1740, a picture packing unit 1750 and a feature prediction neural network 1760.

An entropy decoding unit 1710 may receive a bitstream from a deep learning-based image encoder. An entropy decoding unit 1710 may reconstruct a residual feature map in a form of a one-dimensional vector by performing entropy decoding for a received bitstream by using CABAC or CAVLC. A residual feature map may be generated by rearranging a reconstructed one-dimensional vector into a three-dimensional matrix. A generated residual feature map may be transmitted to a dequantization unit 1720.

A dequantization unit 1720 may dequantize an input quantized feature map to reconstruct a residual feature map. Here, dequantization may refer to scaling by using a quantization step. Alternatively, it may refer to scaling with a quantization step mapped to a quantization parameter transmitted through a bitstream. Alternatively, a dequantization unit 1720 may omit dequantization without performing it. A reconstructed residual feature map may be summed with a prediction feature map, output of a prediction feature map, to generate a reconstructed feature map. A generated reconstructed feature map may be transmitted to a synthetic neural network 1730.

A synthetic neural network 1730 may use a neural network to synthesize an input reconstructed feature map and reconstruct a picture (or a sub-picture). A reconstructed picture (or sub-picture) may be transmitted to a picture buffer 1740.

A picture buffer 1740 may store at least one picture or sub-picture.

A picture packing unit 1750 may receive a plurality of pictures (or sub-pictures) from a picture buffer and pack a received picture to transmit it to a feature prediction neural network 1760. Here, packing may refer to a process of packing to input a plurality of sub-pictures to a feature neural network.

A feature prediction neural network 1760 performs feature map prediction by inputting an input packed sub-picture to a neural network. A feature prediction neural network may be learned so that a total sum of difference values between an original feature map and a prediction neural network becomes small. Alternatively, it may use the same neural network as an analytic neural network. Alternatively, a prediction feature map may have the same shape as an original feature map.

Figure 18:
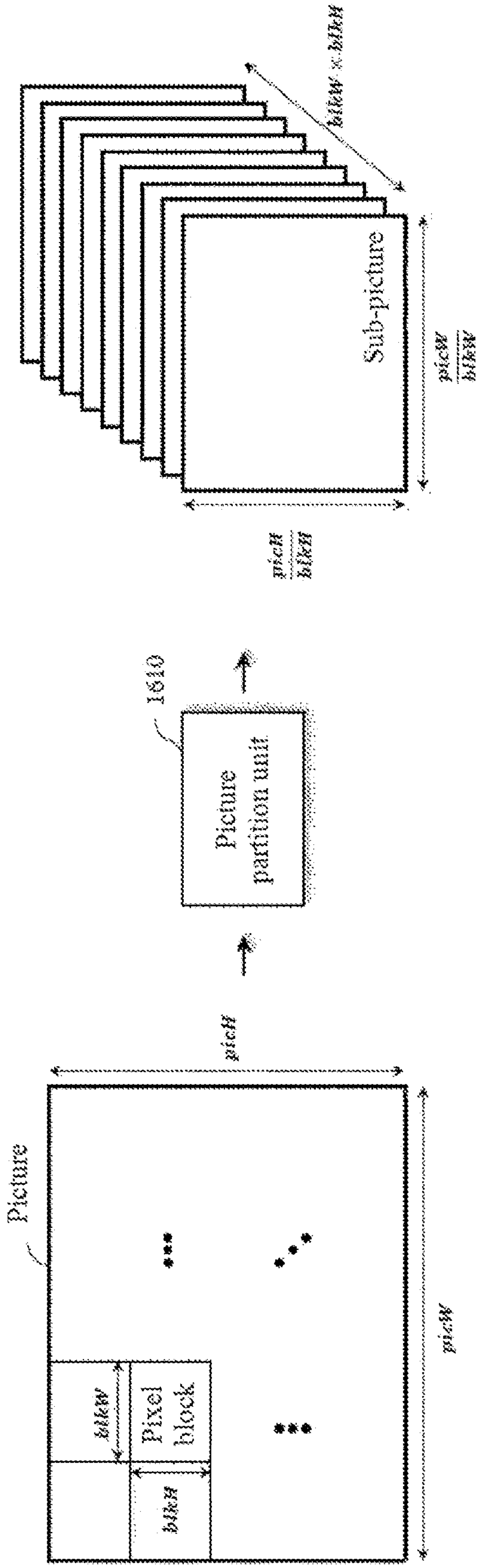
FIG. 18 is a diagram which illustrates a picture partition unit according to an embodiment.

FIG. 18 is a diagram which illustrates a picture partition unit according to an embodiment.

In reference to FIG. 18, a picture partition unit 1610 described in FIG. 16 above is described in more detail. A picture partition unit 1610 may partition an input picture into a plurality of sub-pictures.

In this case, as shown in FIG. 18, a picture partition unit 1610 may partition a picture into pixel blocks (or sample blocks) and generate one sub-picture by using (or combining) pixels at the same position within pixel blocks. In this case, the number of generated sub-pictures may vary depending on a size of a pixel block. As shown in FIG. 18, when a width of a pixel block is blkW and a height is blkH, the number of generated sub-pictures may be blkW×blkH. In other words, in an example, a picture partition unit 1610 may generate a plurality of sub-pictures by downsampling a picture.

In addition, a width and height size of all sub-pictures may be obtained by dividing a width and height size of an input picture by a width and height size of a pixel block. In this case, a pixel block may be square. In this case, a pixel block may be rectangular. In this case, a width and height size in a square and a rectangle may be a multiple of 2 or a square number of 2.

Figure 19:
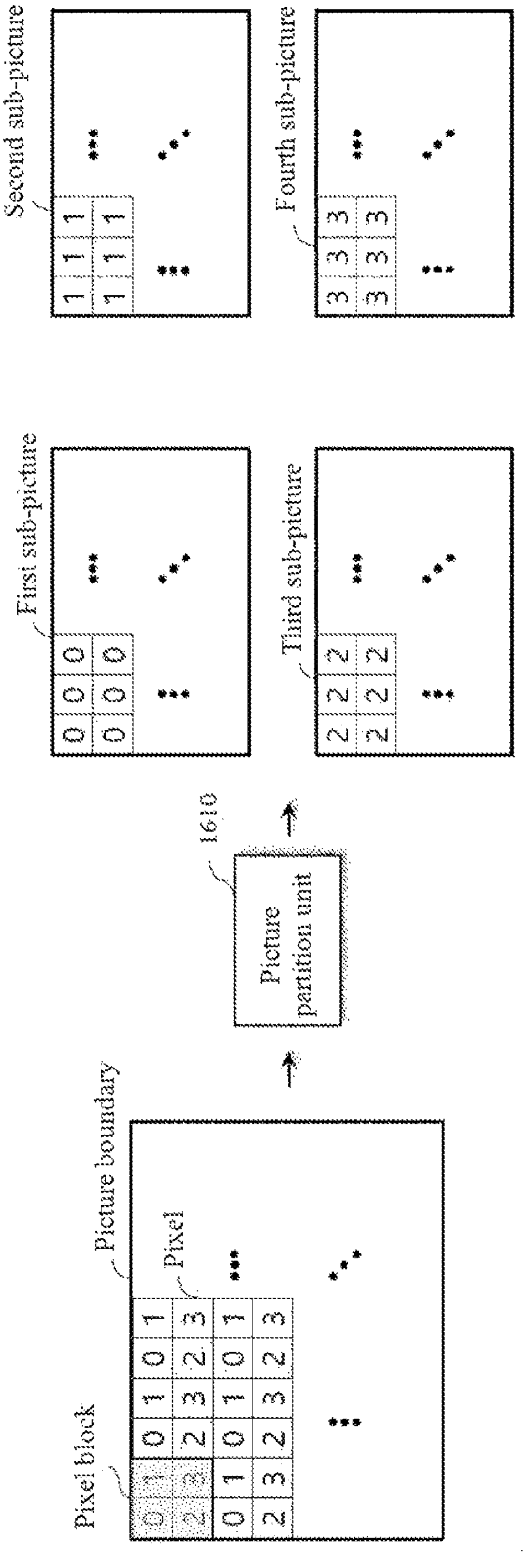
FIG. 19 is a diagram which illustrates a picture partition unit according to an embodiment.

FIG. 19 is a diagram which illustrates a picture partition unit according to an embodiment.

In reference to FIG. 19, a picture partition unit 1610 described in FIG. 16 above is described in more detail. FIG. 19 may be an example which is shown in more detail to help understanding of FIG. 18. With this regard, a description overlapping with FIG. 18 is omitted.

As an embodiment, when a size of a pixel block is 2×2, a total of 4 sub-pictures may be generated. Here, it is assumed that a pixel coordinate inside a pixel block is (x, y).

In this case, a first sub-picture may be a sub-picture generated by combining a (0, 0) pixel in all pixel blocks. In addition, a second sub-picture may be a sub-picture generated by combining a (1, 0) pixel in all pixel blocks. In addition, a third sub-picture may be a sub-picture generated by combining a (0, 1) pixel in all pixel blocks. In addition, a fourth sub-picture may be a sub-picture generated by combining a (1, 1) pixel in all pixel blocks. In the present disclosure, a process of generating a sub-picture by sampling (downsampling) a pixel in a unit of a pixel block as such may be referred to as a pixel shuffle process.

Figure 20:
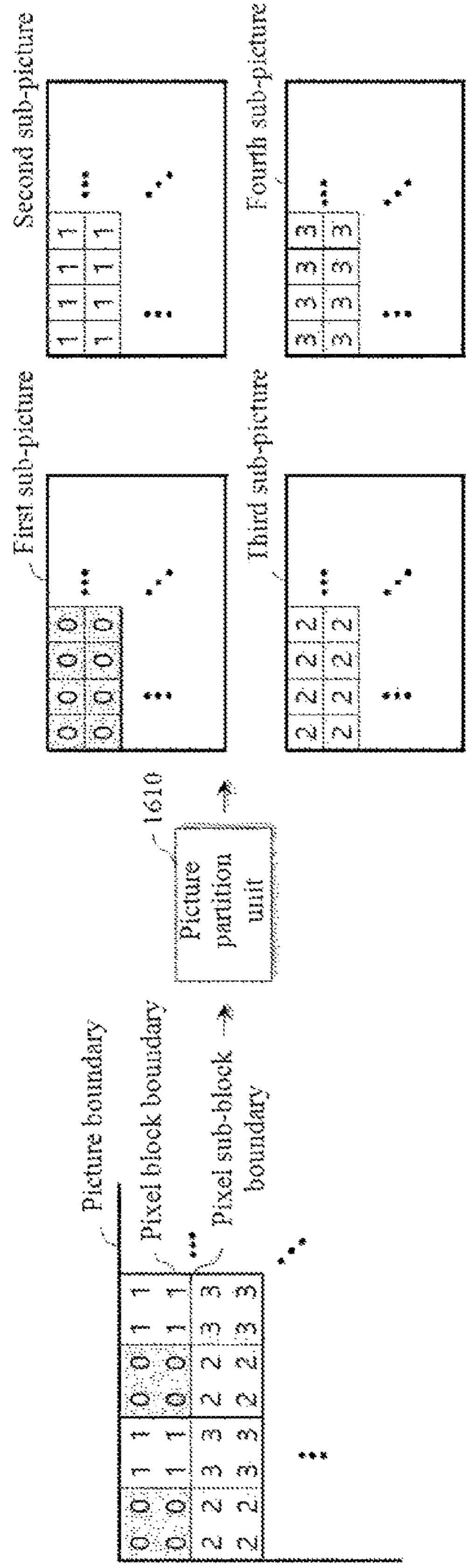
FIG. 20 is a diagram which illustrates a picture partition unit according to an embodiment.

FIG. 20 is a diagram which illustrates a picture partition unit according to an embodiment.

In reference to FIG. 20, a picture partition unit 1610 described in FIG. 16 above is described in more detail. FIG. 20 may be an example which is shown in more detail to help understanding of FIG. 18 and FIG. 19. With this regard, a description overlapping with FIG. 18 and FIG. 19 is omitted.

A picture partition unit 1610 may partition an input picture into a plurality of pixel blocks. In addition, a picture partition unit 1610 may partition one pixel block into a plurality of pixel sub-blocks. In this case, a picture partition unit 1610 may generate a sub-picture by collecting pixel sub-blocks at the same position inside a pixel block in a unit of a pixel block.

As an embodiment, as shown in FIG. 20, a picture partition unit 1610 may partition an input picture into 4×4 pixel blocks. Subsequently, a picture partition unit 1610 may partition a pixel block into 2×2 pixel sub-blocks again. Here, it is assumed that a coordinate of a pixel sub-block in a pixel block is (x, y).

In this case, a first sub-picture may be a sub-picture generated by combining a (0, 0) pixel sub-block in all pixel blocks. In addition, a second sub-picture may be a sub-picture generated by combining a (1, 0) pixel sub-block in all pixel blocks. In addition, a third sub-picture may be a sub-picture generated by combining a (0, 1) pixel sub-block in all pixel blocks. In addition, a fourth sub-picture may be a sub-picture generated by combining a (1, 1) pixel sub-block in all pixel blocks. In the present disclosure, a process of generating a sub-picture by sampling (downsampling) a pixel sub-block in a unit of a pixel block as such may be referred to as a pixel block shuffle process.

Figure 21:
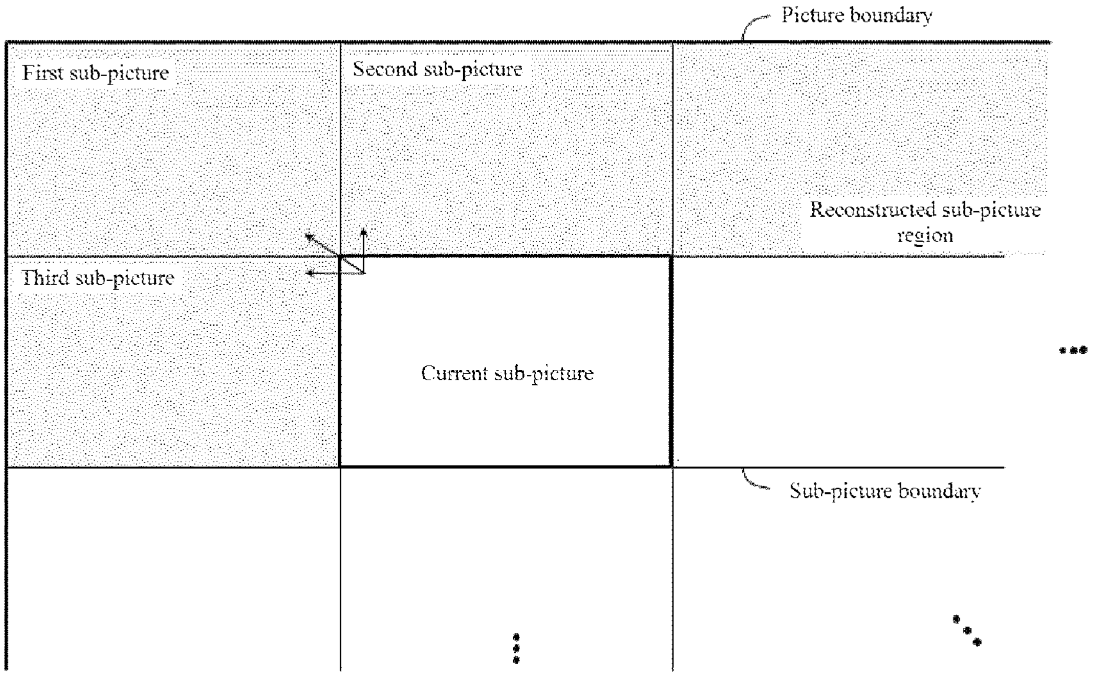
FIG. 21 is a diagram which illustrates a picture partition unit according to an embodiment.

FIG. 21 is a diagram which illustrates a picture partition unit according to an embodiment.

In reference to FIG. 21, a picture partition unit 1610 described in FIG. 16 above is described in more detail. FIG. 21 may be an example which is shown in more detail to help understanding of FIG. 18 to FIG. 20. With this regard, a description overlapping with FIG. 18 to FIG. 20 is omitted.

A picture partition unit 1610 may partition an input picture into a plurality of sub-pictures. In this case, each sub-picture may be partitioned to avoid being overlapped each other. Alternatively, a sub-picture may be partitioned by overlapping some specific regions.

And, image encoding and decoding may be sequentially performed in a unit of a sub-picture in order from the top-left to the bottom-right. In an example, it may be encoded and decoded in a unit of a sub-picture and stored in a picture buffer. As it is encoded and decoded in a unit of a sub-picture and stored in a picture buffer, a top-left, top and left sub-picture may be a pre-reconstructed sub-picture based on a current sub-picture.

In reference to FIG. 21, a top-left, top and left sub-picture may be referred to as a first, second and third sub-picture, respectively. Alternatively, a top-left, top, top-right and left sub-picture may be also referred to as a first, second, third and fourth sub-picture, respectively.

In this embodiment, pre-reconstructed surrounding sub-pictures may be used for current sub-picture prediction. Alternatively, pre-reconstructed surrounding sub-pictures may be used to predict a feature map of a current sub-picture.

Figure 22:
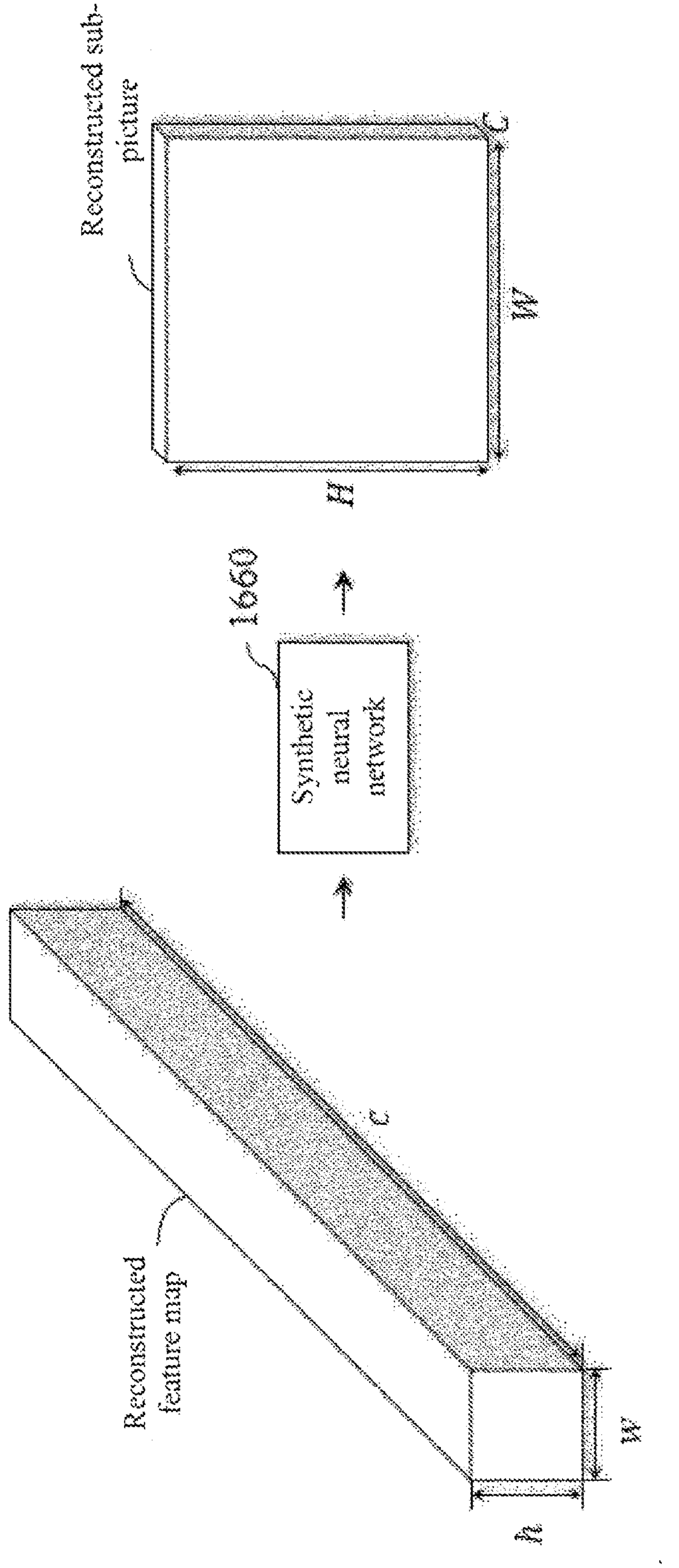
FIG. 22 shows an example of an analytic neural network according to an embodiment.

FIG. 22 shows an example of an analytic neural network according to an embodiment.

In reference to FIG. 22, an analytic neural network 1620 described in FIG. 16 above is described in more detail. With this regard, a description overlapping with FIG. 16 is omitted.

In reference to FIG. 22, an analytic neural network 1620 may receive a sub-picture. An analytic neural network 1620 may analyze an input sub-picture by using a neural network. An analytic neural network 1620 may output a feature map after analyzing a sub-picture. In this case, a sub-picture may be an image. An image may be three-dimensional data expressed by a width (or breadth), a height (or a length) and a channel.

In addition, a feature map generated in an analytic neural network 1620 may generally have a smaller width and/or height size than an image and may have more channels. A feature map extracts a variety of features for sub-picture and arranges them on a channel axis, so as the number of channels increases, a variety of features may be extracted.

Figure 23:
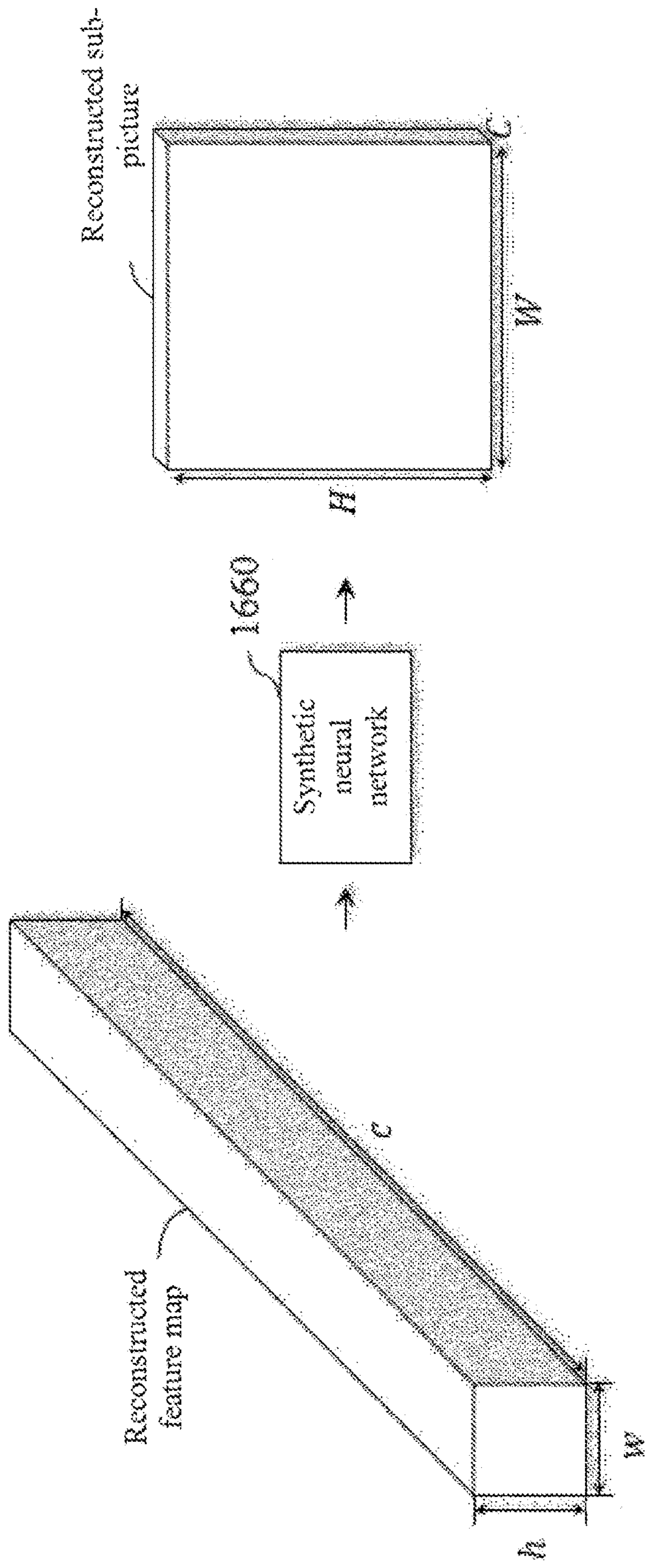
FIG. 23 shows an example of a synthetic neural network according to an embodiment.

FIG. 23 shows an example of a synthetic neural network according to an embodiment.

In reference to FIG. 23, a synthetic neural network 1660 described in FIG. 16 above is described in more detail. With this regard, a description overlapping with FIG. 16 is omitted.

In reference to FIG. 23, a synthetic neural network 1660 may receive a reconstructed feature map and synthesize a feature map based on a neural network to generate a reconstructed picture (or sub-picture).

In this case, a reconstructed picture (or sub-picture) may be an image. A reconstructed image may be three-dimensional data expressed by a width, a height and a channel. In addition, as described above, a generated feature map may generally have a smaller width and/or height size than an image and may have more channels.

Figure 24:
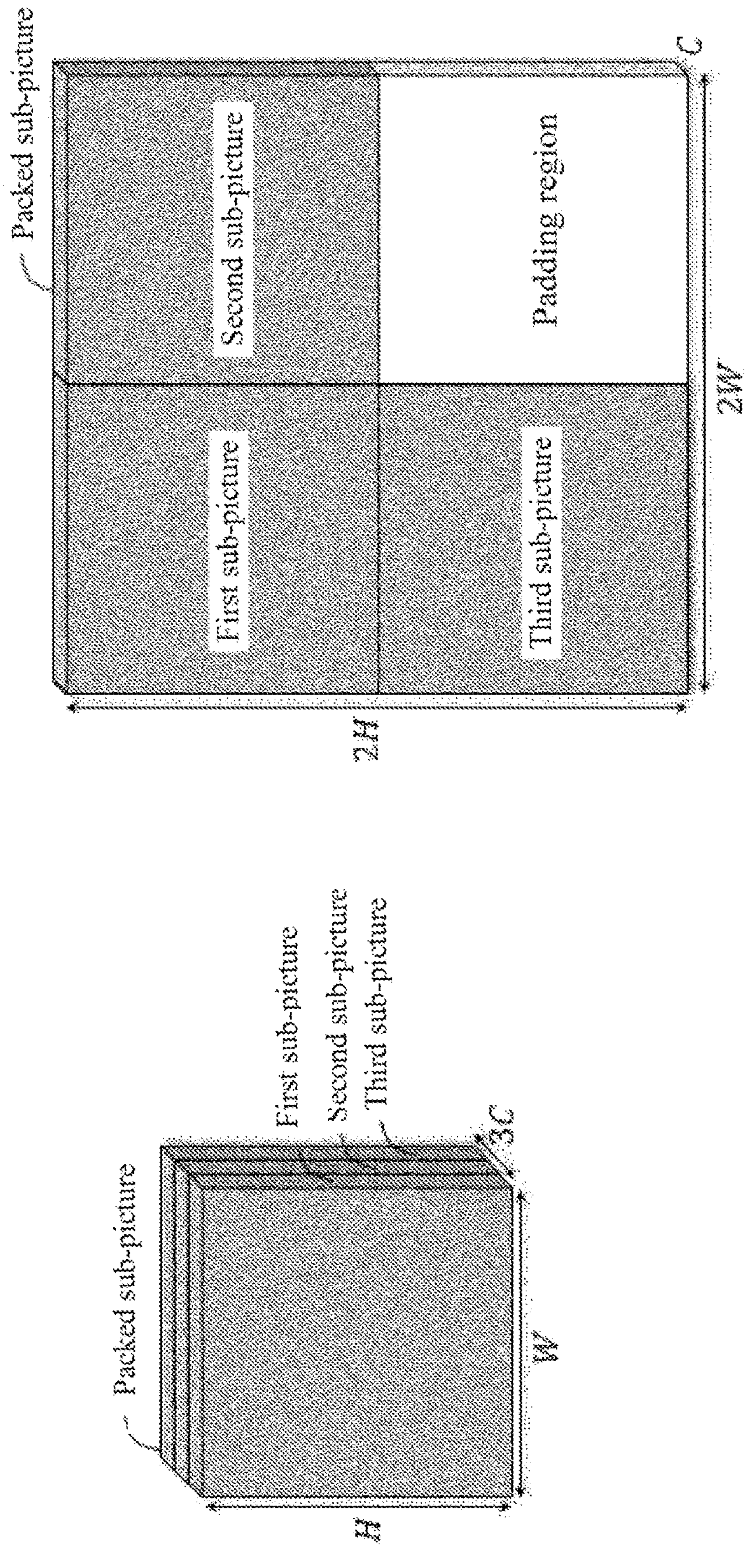
FIG. 24 shows an example of a picture packing unit according to an embodiment.

FIG. 24 shows an example of a picture packing unit according to an embodiment.

In reference to FIG. 24, a picture packing unit 1680 described in FIG. 16 above is described in more detail. With this regard, a description overlapping with FIG. 16 is omitted.

A picture packing unit 1680 may generate one data by packing a plurality of sub-pictures and transmit it to a feature prediction neural network 1690. Hereinafter, in describing an embodiment of the present disclosure, it is described mainly based on a case in which a synthetic neural network 1660 reconstructs a sub-picture, a picture buffer 1670 stores a sub-picture, and a picture packing unit 1680 packs a sub-picture, but the present disclosure is not limited thereto. In other words, in the present disclosure, a synthetic neural network 1660 may generate a picture or a sub-picture. And, a picture buffer 1670 may store a picture or a sub-picture. And, a picture packing unit 1680 may pack a picture or a sub-picture.

In reference to FIG. 24, a picture packing unit 1680 may pack a sub-picture by using a channel packing or space packing method as shown in FIG. 24.

When a channel packing method is used, a picture packing unit 1680 may pack a reconstructed sub-picture stored in a picture buffer 1670 by connecting in a channel axis direction. In this case, if the number of pre-reconstructed sub-pictures is smaller than or smaller than or equal to a predefined threshold value, a picture packing unit 1680 may pad and pack a corresponding sub-picture region.

When a space packing method is used, a picture packing unit 1680 uses spatial position information of a sub-picture to be currently predicted to leave a corresponding region empty and packs the remaining reconstructed surrounding sub-pictures to a surrounding position. In this case, a sub-picture region to be currently predicted may be filled with values by performing a padding process. In an example, zero padding which is entirely filled with 0 may be used by a padding method. Alternatively, a method of using an intermediate value of a current bit depth may be applied by a padding method. Alternatively, padding may be performed with a specific value input by a user by a padding method. Alternatively, a picture packing unit 1680 may perform padding by performing intra-prediction with one or a plurality of surrounding pixel lines.

Figure 25:
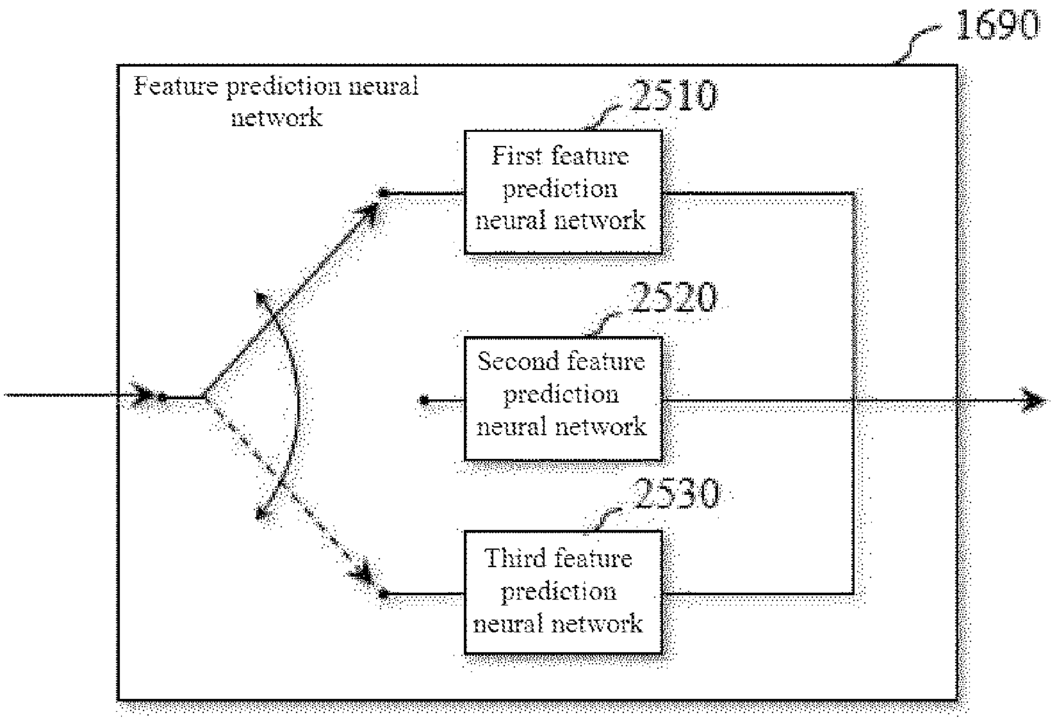
FIG. 25 shows an example of a feature prediction neural network according to an embodiment.

FIG. 25 shows an example of a feature prediction neural network according to an embodiment.

In FIG. 25, a feature prediction neural network 1690 described in FIG. 16 above is described in detail. With this regard, a description overlapping with FIG. 16 is omitted.

In reference to FIG. 25, a feature prediction neural network 1690 may include a first feature prediction neural network 2510, a second feature prediction neural network 2520 and a third feature prediction neural network 2530.

As an embodiment, a feature prediction neural network 1690 may selectively input a picture received in a first feature prediction neural network 2510, a second feature prediction neural network 2520 and a third feature prediction neural network 2530 according to the number of sub-pictures in a packed picture. When 1 sub-picture is used for an input packed picture, an input picture may be input to a first feature prediction neural network 2510. Alternatively, when 2 sub-pictures are used for an input packed picture, it may be input to a second feature prediction neural network 2520. Alternatively, when 3 sub-pictures are used for an input packed picture, it may be input to a third feature prediction neural network 2530.

As another embodiment, it may be selectively input to a first feature prediction neural network 2510, a second feature prediction neural network 2520 and a third feature prediction neural network 2530 according to a shape expressed by a width, a height and the number of channels of an input sub-picture. If data that the number of channels is C is transmitted from a picture packing unit 1680, it may be input to a first feature prediction neural network 2510. Alternatively, if data that the number of channels is 2C is transmitted from a picture packing unit 1680, it may be input to a second feature prediction neural network 2520. Alternatively, if data that the number of channels is 3C is transmitted from a picture packing unit 1680, it may be input to a third feature prediction neural network 2530.

Alternatively, a feature prediction neural network 1690 may transmit a received picture to a different feature prediction neural network according to a packing method.

Figure 26:
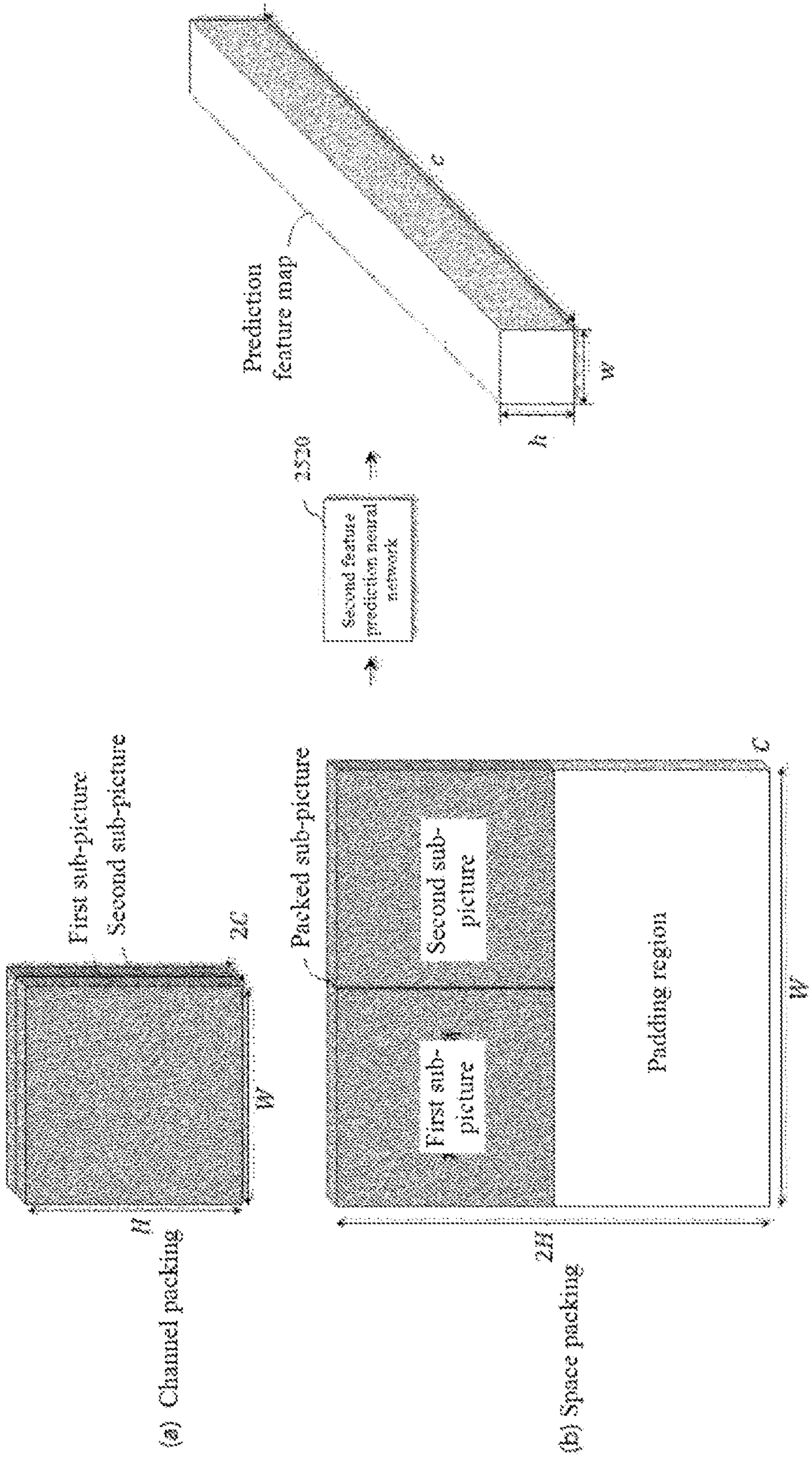
FIG. 26 shows an example of a feature prediction neural network according to an embodiment.

FIG. 26 shows an example of a feature prediction neural network according to an embodiment.

In FIG. 26, a first feature prediction neural network 2510 described in FIG. 25 above is described in detail. With this regard, a description overlapping with FIG. 25 is omitted.

In reference to FIG. 26, a first feature prediction neural network 2510 may use a packed picture to predict a feature map of a current sub-picture.

In this case, when the number of reconstructed sub-pictures used for packing is 1, as shown in FIG. 26, a channel-packed or space-packed sub-picture may be input to a first feature prediction neural network 2510. And, a predicted feature map may be differentiated from an original feature map and transmitted to a quantization unit 1630.

Figure 27:
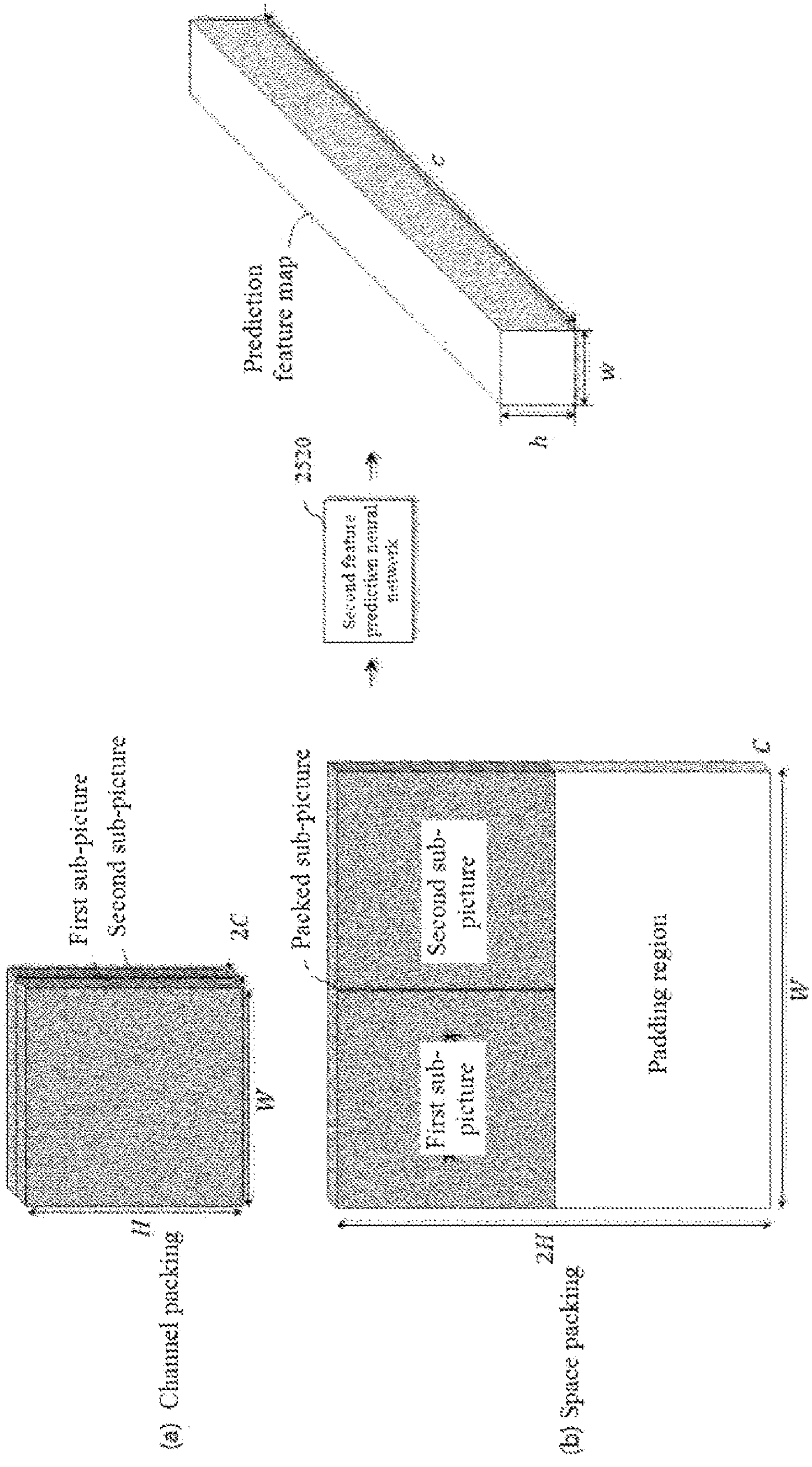
FIG. 27 shows an example of a feature prediction neural network according to an embodiment.

FIG. 27 shows an example of a feature prediction neural network according to an embodiment.

In FIG. 27, a second feature prediction neural network 2520 described in FIG. 25 above is described in detail. With this regard, a description overlapping with FIG. 25 is omitted.

In reference to FIG. 27, a second feature prediction neural network 2520 may use a packed picture to predict a feature map of a current sub-picture.

In this case, when the number of reconstructed sub-pictures used for packing is 2, as shown in FIG. 27, a channel-packed or space-packed sub-picture may be input to a second feature prediction neural network 2520. And, a predicted feature map may be differentiated from an original feature map and transmitted to a quantization unit 1630.

Figure 28:
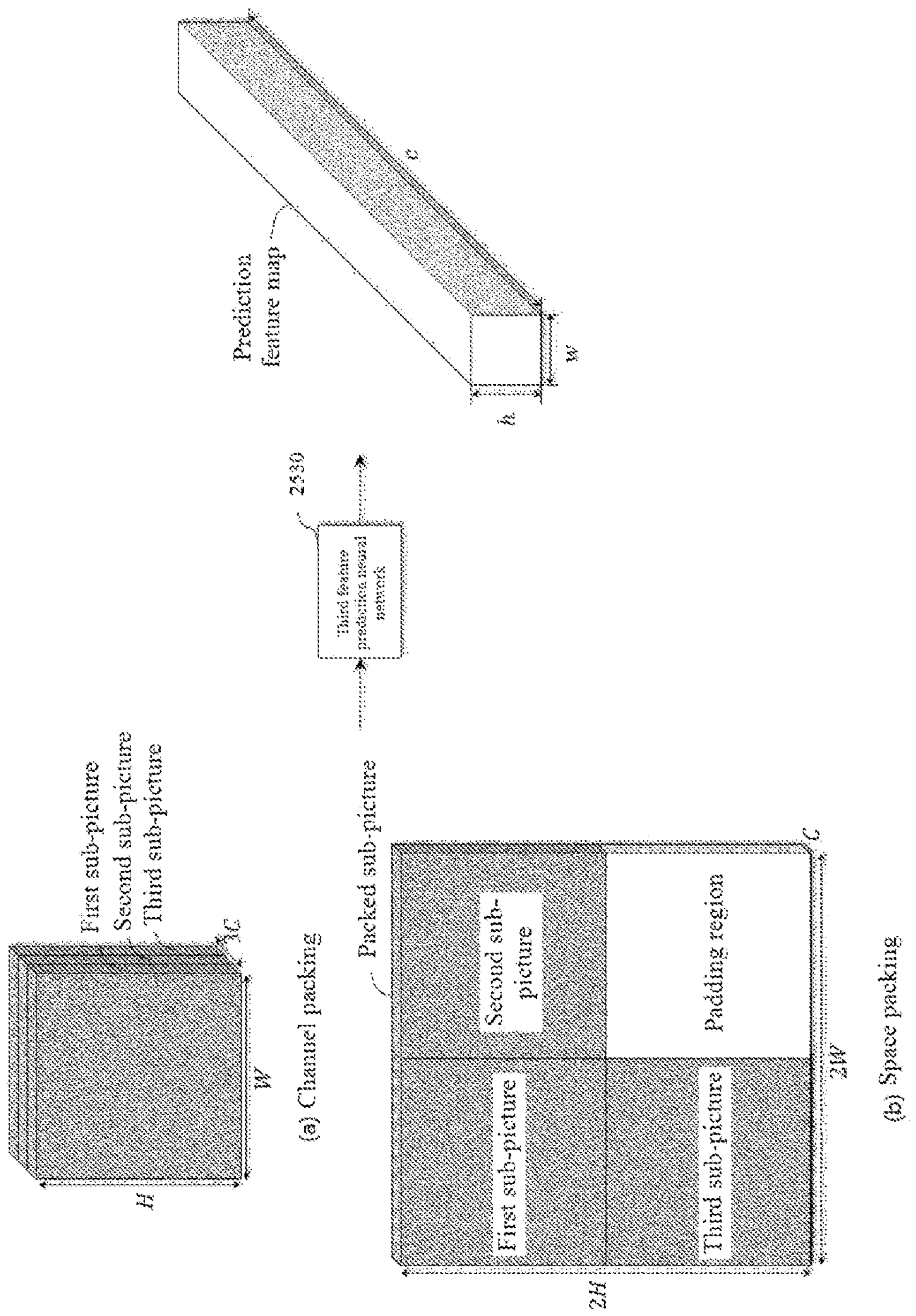
FIG. 28 shows an example of a feature prediction neural network according to an embodiment.

FIG. 28 shows an example of a feature prediction neural network according to an embodiment.

In FIG. 28, a third feature prediction neural network 2530 described in FIG. 25 above is described in detail. With this regard, a description overlapping with FIG. 25 is omitted.

In reference to FIG. 28, a third feature prediction neural network 2530 may use a packed picture to predict a feature map of a current sub-picture.

In this case, when the number of reconstructed sub-pictures used for packing is 3, as shown in FIG. 28, a picture generated by performing channel packing or space packing may be input to a third feature prediction neural network 2530. And, a predicted feature map may be differentiated from an original feature map and transmitted to a quantization unit 1630.

Figure 29:
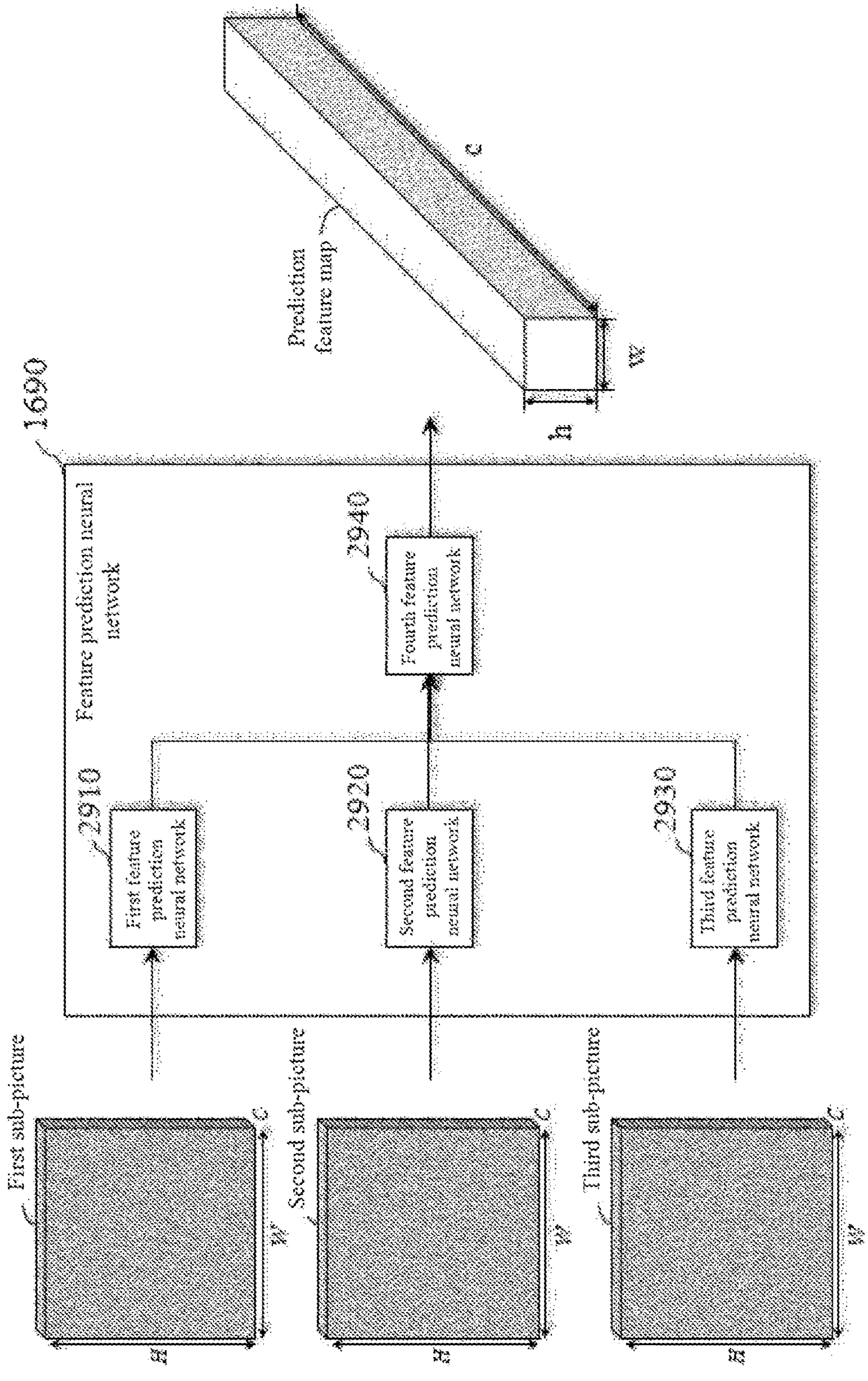
FIG. 29 shows an example of a feature prediction neural network according to an embodiment.

FIG. 29 shows an example of a feature prediction neural network according to an embodiment.

In FIG. 29, a feature prediction neural network 1690 described in FIG. 16 above is described in detail. With this regard, a description overlapping with FIG. 16 is omitted.

In reference to FIG. 29, a feature prediction neural network 390 may include a first feature prediction neural network 2910, a second feature prediction neural network 2920, a third feature prediction neural network 2930 and a fourth feature prediction neural network 2940.

A feature prediction neural network 1690 may receive a plurality of sub-pictures to generate one prediction feature map. In this case, each of a plurality of input sub-pictures may be input to an individual feature prediction neural network.

For example, a first feature prediction neural network 2910 may receive a first sub-picture, a second feature prediction neural network 2920 may receive a second sub-picture and a third feature prediction neural network 2930 may receive a third sub-picture. And, each feature prediction neural network may transmit a generated feature map to a fourth feature prediction neural network 2940.

A fourth feature prediction neural network 2940 may generate a prediction feature map by using a plurality of input feature maps and transmit it to a quantization unit 1630. In an example, a fourth feature prediction neural network 2940 may include a layer integrating a plurality of input feature maps and as an embodiment, a corresponding layer may be a summation layer or a stack layer.

Figure 30:
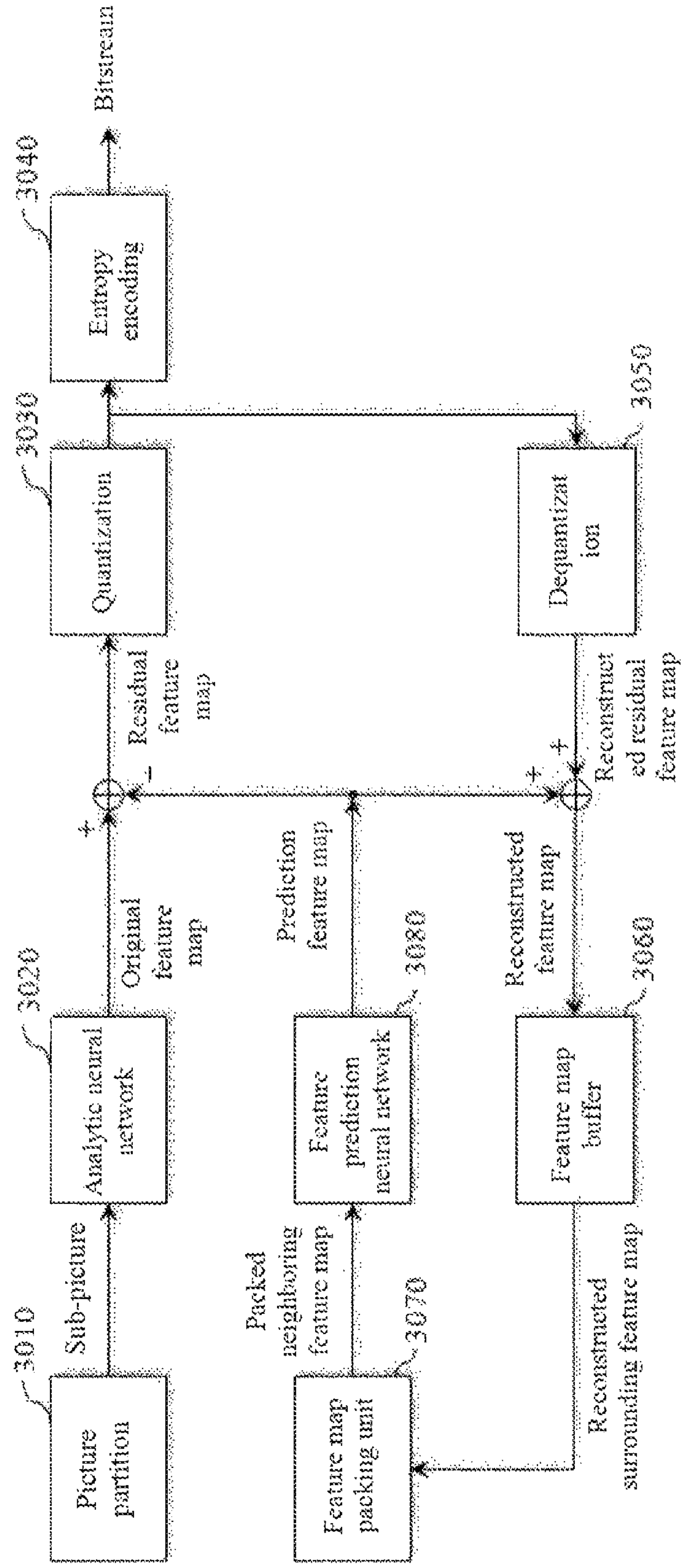
FIG. 30 shows a block diagram of a deep learning-based image encoder according to an embodiment.

FIG. 30 shows a block diagram of a deep learning-based image encoder according to an embodiment.

In reference to FIG. 30, a deep learning-based video encoder may include a picture partition unit 3010, an analytic neural network 3020, a quantization unit 3030, an entropy encoding unit 3040, a dequantization unit 3050, a feature map buffer 3060, a feature map packing unit 3070 and a feature prediction neural network 3080.

A picture partition unit 3010 may partition one picture into a plurality of sub-pictures. A partitioned sub-picture may be input to an analytic neural network 3020.

An analytic neural network 3020 may generate a feature map by analyzing an input sub-picture. A generated feature map may be differentiated from a prediction feature map, output of a feature prediction neural network 3080, and a residual feature map may be generated through it. A generated residual feature map may be transmitted to a quantization unit 3030.

A quantization unit 3030 may quantize an input residual feature map to generate a quantized feature map. Here, quantization may refer to scaling an input feature map with a quantization step (or a quantization parameter). Alternatively, quantization may refer to scaling with a quantization step mapped to a quantization parameter input by a user. Alternatively, quantization may refer to transforming a feature map expressed in a floating point into an integer type through an operation such as rounding off, rounding up, rounding down, etc. A quantized feature map may be transmitted to an entropy encoding unit 3040. In addition, parameters used for quantization may be transmitted to a decoder through an entropy encoding unit 3040. In addition, a quantized feature map may be transmitted to a dequantization unit 3050.

An entropy encoding unit 1640 may rearrange a three-dimensional matrix of an input quantized feature map into a one-dimensional vector and entropy-encodes each element to generates a bitstream. Here, context-based adaptive binary arithmetic coding (CABAC) or context-based adaptive variable-length coding (CAVLC) may be used for entropy encoding. A generated bitstream may be transmitted to a decoder through a communication channel.

A dequantization unit 3050 may dequantize an input quantized feature map to reconstruct a residual feature map. Here, dequantization may refer to scaling with a quantization step (or a quantization parameter). Alternatively, dequantization may refer to scaling with a quantization step mapped to a quantization parameter transmitted through a bitstream. Alternatively, a dequantization unit 3050 may omit dequantization without performing it.

A reconstructed residual feature map may be summed with a prediction feature map, output of a feature prediction neural network 3080, and a reconstructed feature map may be generated through it. A generated reconstructed feature map may be stored in a feature map buffer 3060.

A feature map buffer 3060 may store one or a plurality of feature maps.

A feature map packing unit 3070 may receive a plurality of feature maps from a feature map buffer 3060 and pack (or synthesize or combine) them to transmit them to a feature prediction neural network 3080. Here, packing may refer to a process of packing to input a plurality of feature maps to a feature prediction neural network 3080.

A feature prediction neural network 3080 may perform original feature map prediction by inputting an input packed feature map to a neural network. A feature prediction neural network 3080 may be learned so that a total sum of difference values between an original feature map and a prediction neural network becomes small. Alternatively, a feature prediction neural network 3080 may use the same neural network as an analytic neural network. Alternatively, a prediction feature map may have the same shape as an original feature map.

Figure 31:
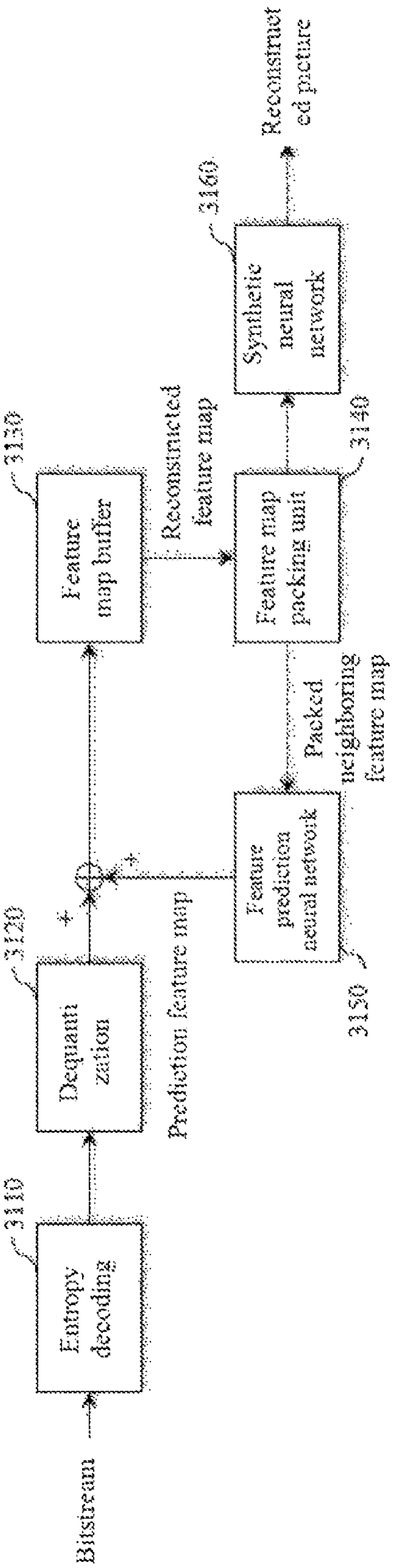
FIG. 31 shows a block diagram of a deep learning-based image decoder according to an embodiment.

FIG. 31 shows a block diagram of a deep learning-based image decoder according to an embodiment.

In reference to FIG. 31, a deep learning-based image decoder includes an entropy decoding unit 3110, a dequantization unit 3120, a feature map buffer 3130, a feature map packing unit 3140, a feature prediction neural network 3150 and a synthetic neural network 3160.

An entropy decoding unit 3110 may receive a bitstream from a deep learning-based image encoder and perform entropy decoding for a received bitstream by using CABAC or CAVLC. An entropy decoding unit 3110 may reconstruct a residual feature map in a form of a one-dimensional vector through entropy decoding. A residual feature map may be generated by rearranging a reconstructed one-dimensional vector into a three-dimensional matrix. A generated residual feature map may be transmitted to a dequantization unit 3120.

A dequantization unit 3120 may dequantize an input quantized feature map to reconstruct a residual feature map. Here, dequantization may refer to scaling with a quantization step (or a quantization parameter). Alternatively, dequantization may refer to scaling with a quantization step mapped to a quantization parameter transmitted through a bitstream. Alternatively, a dequantization unit 3120 may omit dequantization without performing it. A reconstructed residual feature map may be summed with a prediction feature map, output of a feature prediction neural network 3150, to generate a reconstructed feature map. A generated reconstructed feature map may be stored in a feature map buffer 3060.

A feature map buffer 3130 may store one or a plurality of reconstructed feature maps.

A feature map packing unit 3140 may receive a plurality of feature maps from a feature map buffer 3130 and pack them to transmit them to a feature prediction neural network 3150. Here, packing may refer to a process of packing to input a plurality of feature maps to a feature neural network. Alternatively, when all sub-picture feature maps are reconstructed, packing may refer to packing for outputting them. In this case, a packed feature map may be transmitted to a synthetic neural network 3160.

A feature prediction neural network 3150 may perform original feature map prediction by inputting an input packed feature map to a neural network. A feature prediction neural network 3150 may be learned so that a total sum of difference values between an original feature map and a prediction neural network becomes small. Alternatively, a feature prediction neural network 3150 may use the same neural network as an analytic neural network. Alternatively, a prediction feature map may have the same shape as an original feature map.

A synthetic neural network 3160 may synthesize an input packed and reconstructed feature map through a neural network and reconstruct a picture.

Figure 32:
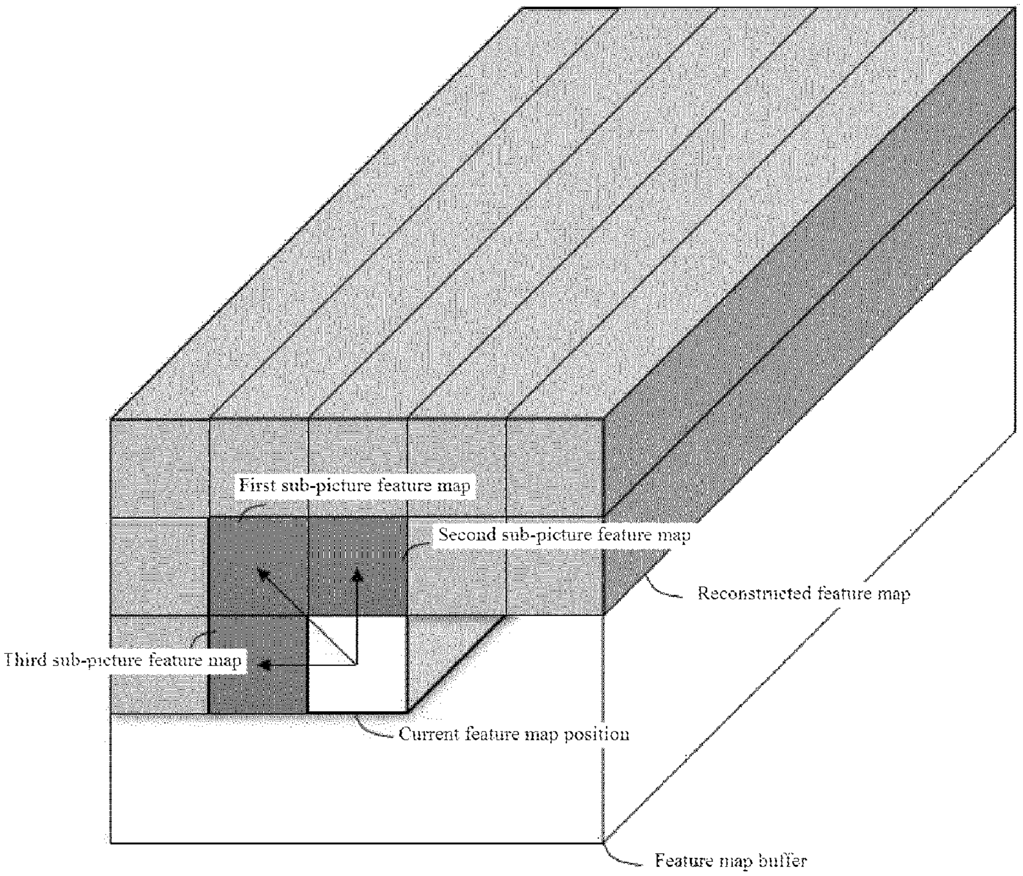
FIG. 32 is a diagram for describing a feature map buffer according to an embodiment.

FIG. 32 is a diagram for describing a feature map buffer according to an embodiment.

In reference to FIG. 32, a case is assumed that a sub-picture is partitioned to avoid being overlapped each other in a picture partition unit (1610 of FIG. 16 and 3010 of FIG. 30 above) as in an example of FIG. 21. A form that a reconstructed feature map is stored in a feature map buffer (3060 of FIG. 30 and 3130 of FIG. 31 above) may be as shown in FIG. 32. And, a position relationship between reconstructed feature maps and a feature map to be currently reconstructed may be as shown in FIG. 32.

A feature map buffer 3060, 3130 may store feature maps which are sequentially reconstructed for sub-pictures generated in a picture partition unit 1610, 3010. In this case, as in an example of FIG. 32, they may be stored in order from the top-left to the bottom-right. It may be the same position as a position of a sub-picture in all pictures.

In this case, since a feature map to be currently reconstructed has not yet been reconstructed, it may be an empty space. As a top-left, top and left feature map of a feature map to be currently reconstructed are a surrounding reconstructed feature map, they may be used for predicting a current feature map. In this embodiment, each feature map may be referred to as a first sub-picture feature map, a second sub-picture feature map and a third sub-picture feature map. If an additional surrounding feature map is required, a top-right reconstructed feature map may be used.

Figure 33:
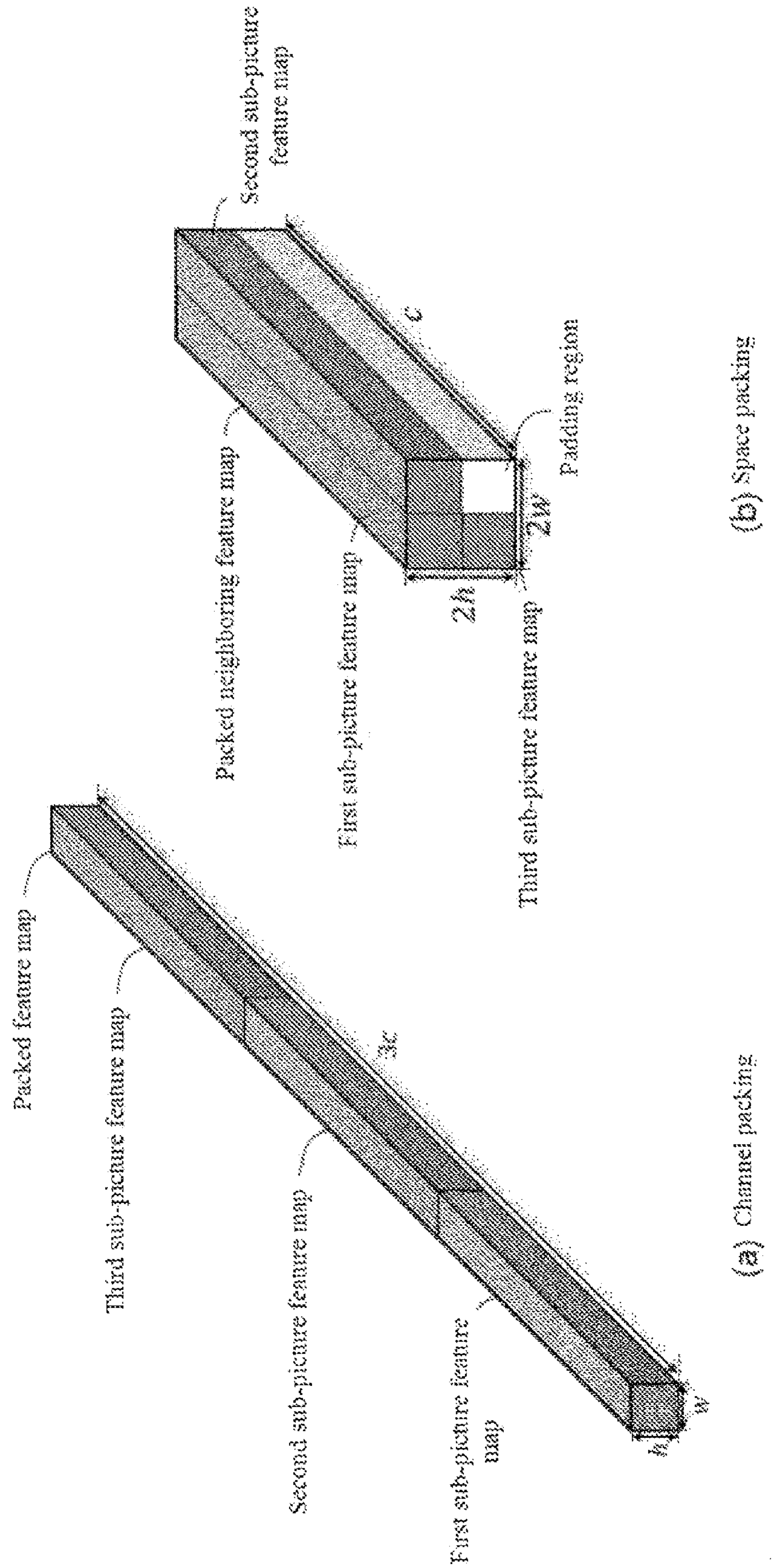
FIG. 33 is a diagram for describing a feature map packing unit according to an embodiment.

FIG. 33 is a diagram for describing a feature map packing unit according to an embodiment.

In reference to FIG. 33, a feature map packing unit 3080, 3140 described in FIG. 30 and FIG. 31 above is described in more detail. A feature map packing unit may generate one feature map by packing a plurality of sub-picture feature maps and transmit it to a feature prediction neural network (3080 and 3150 described in FIG. 30 and FIG. 31 above). Here, a sub-picture feature map may indicate a feature map for a sub-picture. In this case, a sub-picture feature map may be a map including meaningful information, for example, a contour of an image, luminance, a shape of an object, etc., but it is not limited thereto, and it may include every meaningful information required for image processing.

As an embodiment, channel packing and/or space packing may be used as shown in FIG. 33 as a packing method.

When a channel packing method is used, a feature map packing unit may pack a sub-picture feature map reconstructed in a feature map buffer 3060 by connecting it in a channel axis direction. In this case, when the number of pre-reconstructed sub-picture feature maps is less than a predefined specific threshold value, a feature map packing unit may pad and pack a corresponding sub-picture feature map region.

When a space packing method is used, a feature map packing unit may use spatial position information of a sub-picture feature map to be currently predicted to leave a corresponding region empty and pack the remaining reconstructed sub-picture feature maps to a surrounding position. In this case, padding may be performed for a sub-picture feature map region to be currently predicted and replaced with a specific value. In an example, zero padding which is entirely filled with 0 may be used by a padding method. Alternatively, an intermediate value of a current bit depth may be used by a padding method. Alternatively, a feature map packing unit may be padded with a specific value input by a user. Alternatively, a feature map packing unit may perform padding by performing intra-prediction by using one or a plurality of surrounding pixel lines of the same channel.

Figure 34:
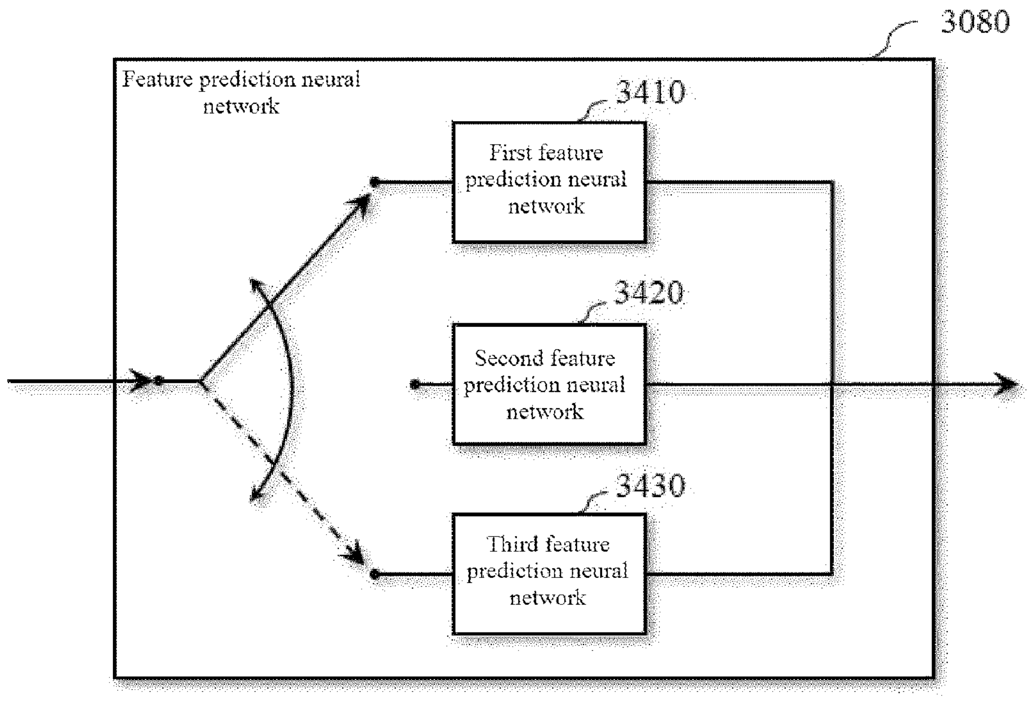
FIG. 34 shows an example of a feature prediction neural network according to an embodiment.

FIG. 34 shows an example of a feature prediction neural network according to an embodiment.

In reference to FIG. 34, a feature prediction neural network 3080 of FIG. 30 above is described in more detail. A related overlapping description is omitted. A feature prediction neural network 3080 may include a plurality of feature prediction neural networks.

In reference to FIG. 34, a feature prediction neural network 3080 may include a first feature prediction neural network 3410, a second feature prediction neural network 3420 and a third feature prediction neural network 3430.

A feature prediction neural network 3080 may selectively input an input feature map in a first feature prediction neural network 3410, a second feature prediction neural network 3420 and a third feature prediction neural network 3430 according to the number of sub-picture feature maps in a packed feature map. When 1 sub-picture feature map is used for an input packed feature map, an input feature map may be input to a first feature prediction neural network 3410. Alternatively, when 2 sub-picture feature maps are used for an input packed picture, an input feature map may be input to a second feature prediction neural network 3420. Alternatively, when 3 sub-picture feature maps are used for an input packed picture, an input feature map may be input to a third feature prediction neural network 3430.

In another example, a feature map may be selectively input to a first feature prediction neural network 3410, a second feature prediction neural network 3420 and a third feature prediction neural network 3430 according to a form or a shape of a feature map expressed by a width, a height and a channel of an input feature map. If a feature map that the number of channels is C is generated and transmitted from a picture packing unit 3070, a feature map may be input to a first feature prediction neural network 3410. Alternatively, if a feature map that the number of channels is 2c is generated and transmitted from a picture packing unit 3070, a feature map may be input to a second feature prediction neural network 3420. Alternatively, if a feature map that the number of channels is 3c is generated and transmitted from a picture packing unit 3070, a feature map may be input to a third feature prediction neural network 3430.

Alternatively, a feature prediction neural network 3080 may transmit a received packed feature map to a different feature prediction neural network according to a packing method.

Figure 35:
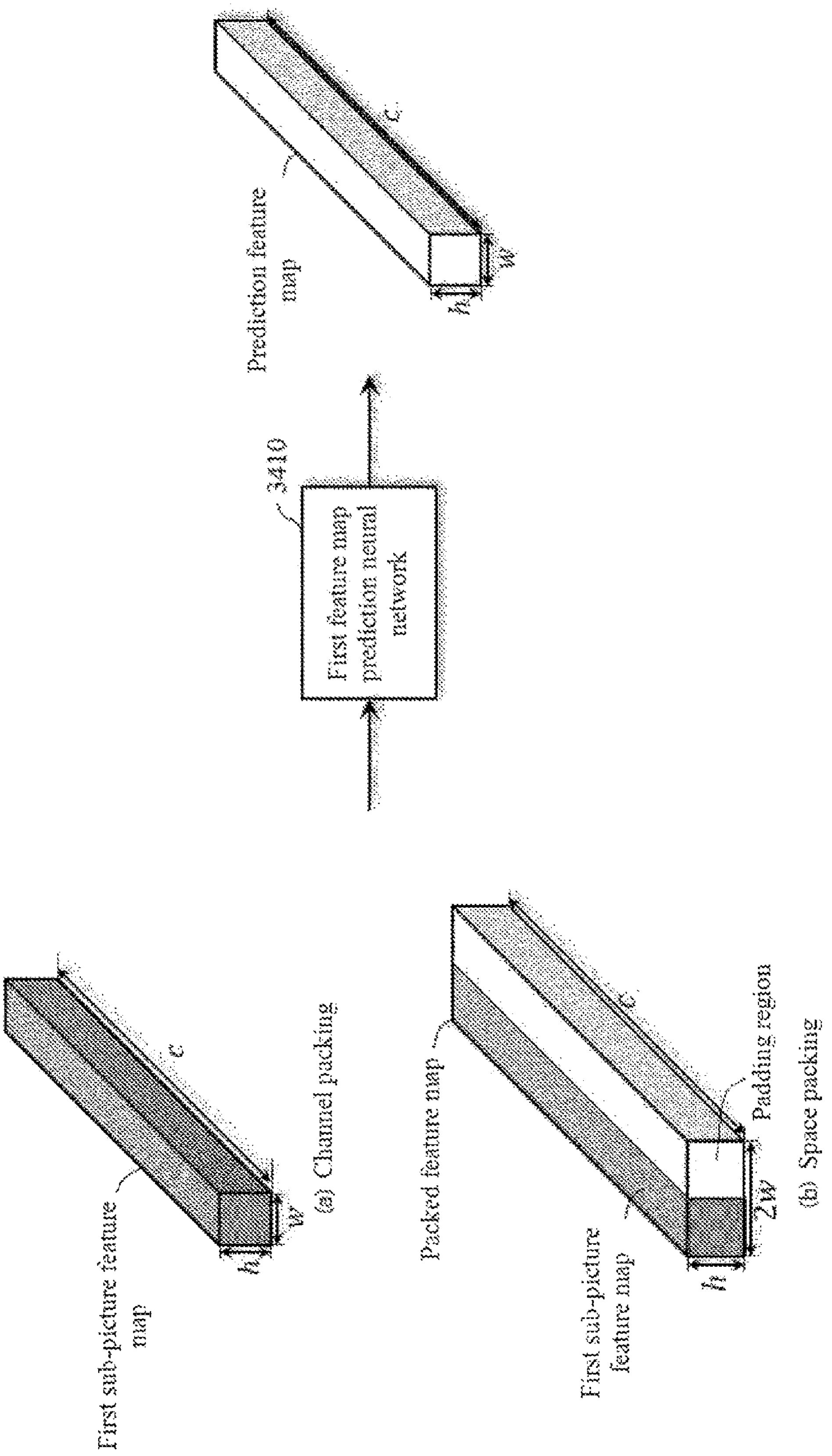
FIG. 35 shows an example of a feature prediction neural network according to an embodiment.

FIG. 35 shows an example of a feature prediction neural network according to an embodiment.

In FIG. 35, a first feature prediction neural network (or a first feature map prediction neural network) 3410 described in FIG. 34 above is described in more detail. With this regard, a description overlapping with FIG. 34 is omitted.

In reference to FIG. 35, a first feature prediction neural network 3410 may use a packed feature map to predict a feature map of a current sub-picture.

In this case, when the number of reconstructed sub-picture feature maps used for packing is 1, as shown in FIG. 35, a channel-packed or space-packed sub-picture may be input to a first feature prediction neural network 3410.

And, a feature map predicted by a first feature prediction neural network 3410 may be differentiated from an original feature map and transmitted to a quantization unit 3030.

Figure 36:
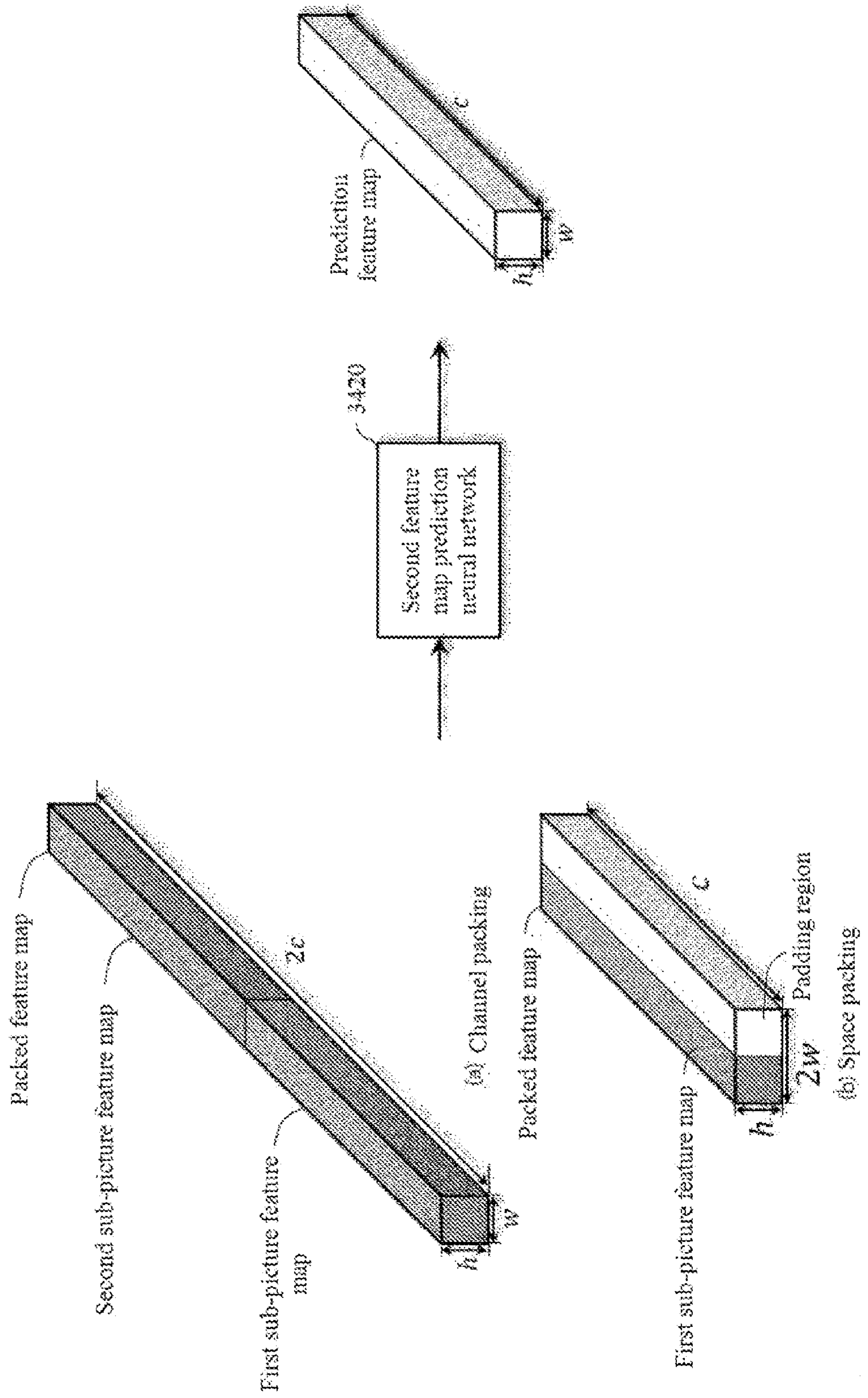
FIG. 36 shows an example of a feature prediction neural network according to an embodiment.

FIG. 36 shows an example of a feature prediction neural network according to an embodiment.

In FIG. 36, a second feature prediction neural network (or a second feature map prediction neural network) 3420 described in FIG. 34 above is described in more detail. With this regard, a description overlapping with FIG. 34 is omitted.

In reference to FIG. 36, a second feature prediction neural network 3420 may use a packed feature map to predict a feature map of a current sub-picture.

In this case, when the number of reconstructed sub-picture feature maps used for packing is 2, as shown in FIG. 36, a channel-packed or space-packed sub-picture may be input to a second feature prediction neural network 3420.

A feature map predicted by a second feature prediction neural network 3420 may be differentiated from an original feature map and transmitted to a quantization unit 3030.

Figure 37:
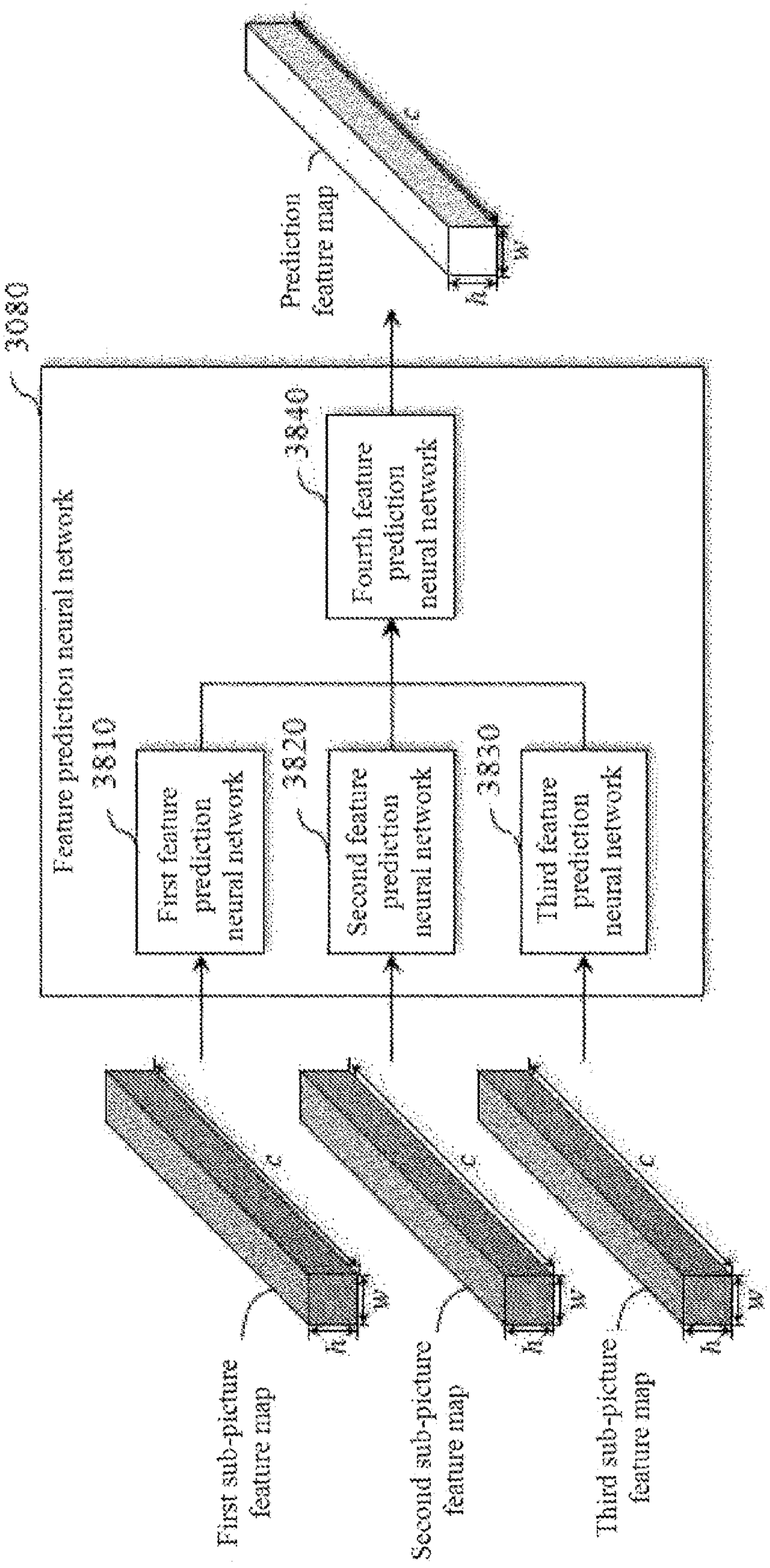
FIG. 37 shows an example of a feature prediction neural network according to an embodiment.

FIG. 37 shows an example of a feature prediction neural network according to an embodiment.

In FIG. 37, a third feature prediction neural network (or a third feature map prediction neural network) 3430 described in FIG. 34 above is described in more detail. With this regard, a description overlapping with FIG. 34 is omitted.

In reference to FIG. 37, a third feature prediction neural network 3430 may use a packed feature map to predict a feature map of a current sub-picture.

In this case, when the number of reconstructed sub-picture feature maps used for packing is 3, as shown in FIG. 37, a channel-packed or space-packed sub-picture may be input to a third feature prediction neural network 3430.

A feature map predicted by a third feature prediction neural network 3430 may be differentiated from an original feature map and transmitted to a quantization unit 3030.

Figure 38:
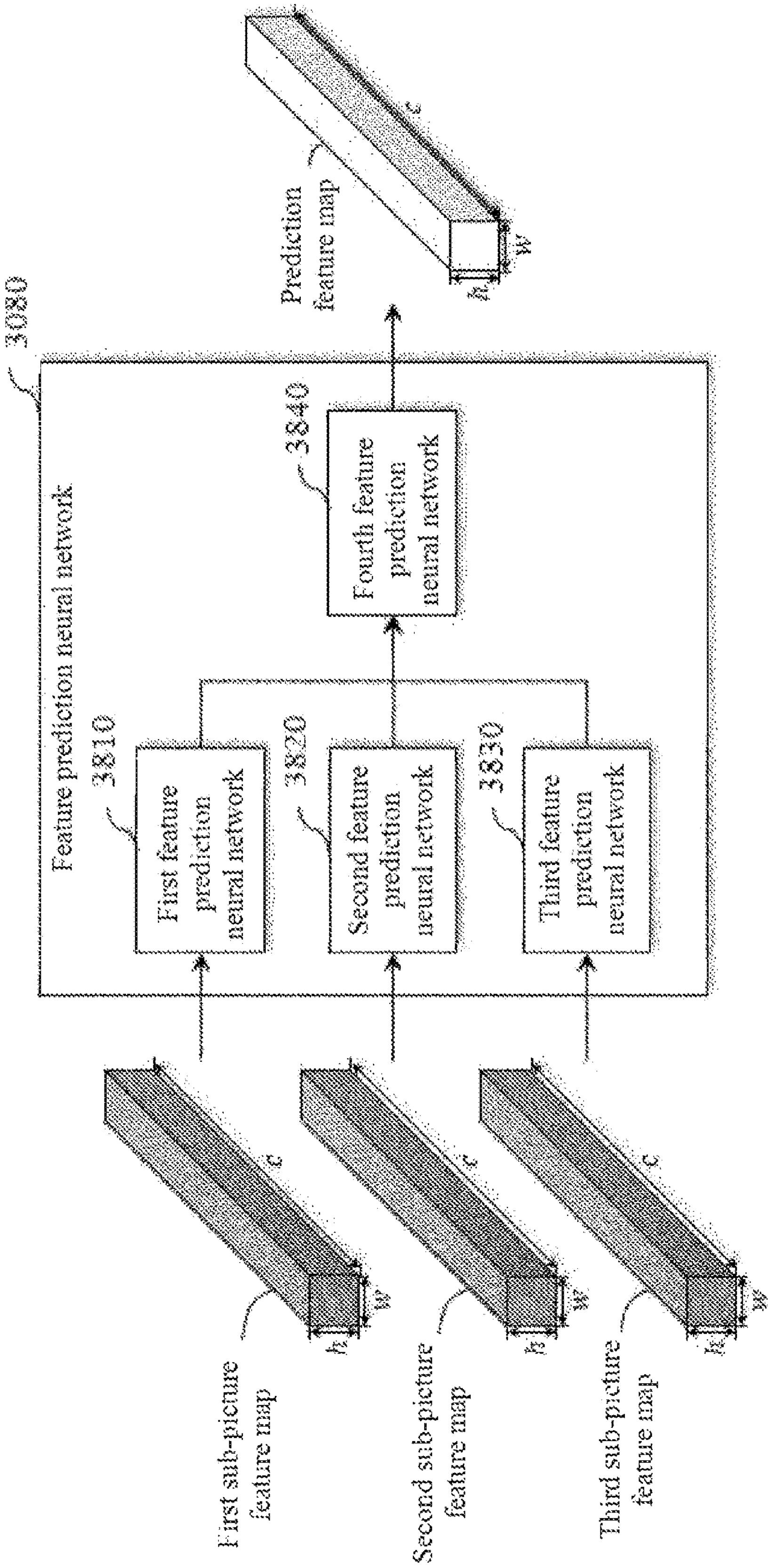
FIG. 38 shows an example of a feature prediction neural network according to an embodiment.

FIG. 38 shows an example of a feature prediction neural network according to an embodiment.

In FIG. 38, a feature prediction neural network (or a feature map prediction neural network) described in FIG. 34 above is described in more detail. With this regard, a description overlapping with FIG. 34 is omitted.

In reference to FIG. 38, a feature prediction neural network 3080 may include a first feature prediction neural network 3810, a second feature prediction neural network 3820, a third feature prediction neural network 3830 and a fourth feature prediction neural network 3840.

A feature prediction neural network 3080 may receive a plurality of sub-picture feature maps to generate one prediction feature map. In this case, a feature prediction neural network 3080 may input each of a plurality of input sub-picture feature maps to an individual feature prediction neural network.

For example, a first feature prediction neural network 3810 may receive a first sub-picture feature map, a second feature prediction neural network 3820 may receive a second sub-picture feature map and a third feature prediction neural network 3830 may receive a third sub-picture. And, each feature prediction neural network may transmit all generated feature maps to a fourth feature prediction neural network 3840.

A fourth feature prediction neural network 3840 may generate a prediction feature map by using a plurality of input feature maps and transmit it to a quantization unit 30730. In addition, a fourth feature prediction neural network 3840 may include a layer integrating (or summing or combining) a plurality of input feature maps. For example, a layer integrating the plurality of feature maps may be positioned at the front of a fourth feature prediction neural network 3840. As an embodiment, a corresponding layer may be a summation layer or a stack layer.

Embodiments described above may be a combination of components and features of the present disclosure in a predetermined form. Each component or feature should be considered selective unless explicitly stated otherwise. Each component or feature may be implemented in a form which is not combined with other component or feature. In addition, some components and/or features may be combined to configure an embodiment of the present disclosure. Order of operations described in embodiments of the present disclosure may be changed. Some configurations or features of an embodiment may be included in other embodiment or may be replaced with a configuration or a feature corresponding to other embodiment. It is obvious that claims without an explicit citation relationship in a scope of claims may be combined to configure an embodiment or may be included as a new claim by amendment after application.

An embodiment according to the present disclosure may be implemented by a variety of means, for example, hardware, firmware, software, or a combination thereof, etc. For implementation by hardware, an embodiment of the present disclosure may be implemented by one or more ASICs (application specific integrated circuits), DSPs (digital signal processors), DSPDs (digital signal processing devices), PLDs (programmable logic devices), FPGAs (field programmable gate arrays), processors, controllers, micro controllers, micro processors, etc.

In addition, for implementation by firmware or software, an embodiment of the present disclosure may be implemented in a form of a module, a procedure, a function, etc. performing functions or operations described above and may be recorded in a readable recoding medium through a variety of computer means. Here, a recording medium may include a program instruction, a data file, a data structure, etc. alone or in combination. A program instruction recorded in a recording medium may be those specially designed and configured for the present disclosure or those available by being notified to a person skilled in computer software. For example, a recording medium includes magnetic media such as a hard disk, a floppy disk and a magnetic tape, optical media such as CD-ROM (Compact Disk Read Only Memory) and DVD (Digital Video Disk), magneto-optical media such as a floptical disk and a hardware device which is specially configured to store and perform a program instruction such as ROM, RAM, a flash memory, etc. An example of a program instruction may include a high-level language code which may be executed by a computer by using an interpreter, etc. as well as a machine language code like what is made by a compiler. Such a hardware device may be configured to operate as at least one software module to perform an operation of the present disclosure and vice versa.

In addition, a device or a terminal according to the present disclosure may be driven by a command which causes at least one processor to perform functions and processes described above. For example, such a command may include, for example, an interpreted command like a script command such as a JavaScript or ECMAScript command, etc. or other commands stored in a computer readable medium readable or an executable code. Further, a device according to the present disclosure may be implemented in a distributed way across a network such as Server Farm or may be implemented in a single computer device.

In addition, a computer program which comes with a device according to the present disclosure and executes a method according to the present disclosure (also known as a program, software, a software application, a script or a code) may be written in any form of a programming language including a compiled or interpreted language or a priori or procedural language and may be deployed in any form including a stand-alone program, module, component or subroutine or other units suitable for use in a computer environment. A computer program does not necessarily correspond to a file of a file system. A program may be stored in a single file provided for a requested program, or in multiple interacting files (e.g., a file storing part of at least one module, subprogram or code), or in part of a file owning other program or data (e.g., at least one script stored in a markup language document). A computer program may be positioned in one site or distributed across a plurality of sites and may be deployed to be executed on one computer or multiple computers interconnected by a communication network.

It is obvious to a person skilled in the art that the present disclosure may be implemented in other specific form without departing from an essential feature of the present disclosure. Accordingly, the above-described detailed description should not be interpreted restrictively in all respects and should be considered illustrative. A scope of the present disclosure should be determined by reasonable interpretation of attached claims and all changes within an equivalent scope of the present disclosure are included in a scope of the present disclosure.

INDUSTRIAL AVAILABILITY

The present disclosure may be used for a deep learning-based video compression method and device.

The invention claimed is:

1. A deep learning-based signal processing method, the method comprising:

acquiring a quantized feature map and compression rate information from a bitstream;

reconstructing the feature map by performing dequantization for the quantized feature map; and synthesizing the reconstructed feature map based on a neural network, wherein based on the compression rate information, the neural network is determined from among a plurality of synthetic neural networks respectively corresponding to a plurality of predefined compression rates, wherein the synthesizing further includes:

generating an intermediate feature map from at least one neural network layer of the neural network;

transforming the compression rate information into a compression rate map, wherein the compression rate map is multi-dimensional data including at least one of a vector and a matrix; and modulating the intermediate feature map by performing a multiplication between the compression rate map and the intermediate feature map, wherein the multiplication is performed as a channel-wise multiplication when the compression rate map is the vector, and as an element-wise multiplication when the compression rate map is the matrix.

2. The method according to claim 1, wherein the plurality of synthetic neural networks are learned based on a loss algorithm which minimizes at least one of a bits per pixel (BPP), a peak signal-to-noise ratio (PSNR), or structural similarity index measure (SSIM) at a corresponding compression rate respectively.

3. The method according to claim 1, wherein the compression rate information includes an index which indicates a specific quantization step size within a predefined quantization step size table.

4. The method according to claim 1, wherein the neural network includes at least one neural network layer of a convolution layer, a correlation layer, a sampling layer, a pooling layer, a transform layer, a shuffle layer, a summation layer, a difference layer, or a stack layer.

5. The method according to claim 1, wherein synthesizing the feature map comprises;

generating a prediction feature map of a current sub-picture by performing prediction for the feature map of the current sub-picture in a current picture; and synthesizing the feature map of the current sub-picture by adding the prediction feature map to the reconstructed feature map.

6. The method according to claim 5, wherein the reconstructed feature map includes a residual feature map of the current sub-picture.

7. The method according to claim 5, wherein the neural network is learned to minimize a sum of difference values between the prediction feature map and an original feature map.

8. The method according to claim 5, wherein the current sub-picture is generated by adding pixels at a specific position in pixel blocks partitioned from the current picture.

9. A deep learning-based signal processing device, the device comprising:

a processor which controls the signal processing device; and a memory which is combined with the processor and stores data, wherein the processor is configured to:

acquire a quantized feature map and compression rate information from a bitstream;

reconstruct a feature map by performing dequantization for the quantized feature map; and synthesize the reconstructed feature map based on a neural network, wherein based on the compression rate information, the neural network is determined from among a plurality of synthetic neural networks respectively corresponding to a plurality of predefined compression rates, wherein, to synthesize the reconstructed feature map, the processor is further configured to:

generate an intermediate feature map from at least one neural network layer of the neural network, transform the compression rate information into a compression rate map, wherein the compression rate map is multi-dimensional data including at least one of a vector and a matrix, and modulate the intermediate feature map by performing a multiplication between the compression rate map and the intermediate feature map, wherein the multiplication is performed as a channel-wise multiplication when the compression rate map is the vector, and as an element-wise multiplication when the compression rate map is the matrix.

* * * * *